United States Patent
Wolfe et al.

(10) Patent No.: US 8,958,917 B2
(45) Date of Patent: *Feb. 17, 2015

(54) METHOD AND SYSTEM FOR REMOTE MONITORING OF FLUID QUALITY AND TREATMENT

(75) Inventors: Thomas D. Wolfe, Grass Valley, CA (US); Charles Scholpp, Fort Collins, CO (US)

(73) Assignee: Hach Company, Loveland, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/565,091

(22) Filed: Sep. 23, 2009
(Under 37 CFR 1.47)

(65) Prior Publication Data
US 2010/0204924 A1 Aug. 12, 2010

Related U.S. Application Data

(63) Continuation-in-part of application No. 11/331,721, filed on Jan. 13, 2006, which is a continuation-in-part of application No. 10/392,112, filed on Mar. 19, 2003, now Pat. No. 7,454,295, which is a (Continued)

(51) Int. Cl.
*G06F 15/00* (2006.01)
*C02F 1/00* (2006.01)

(52) U.S. Cl.
CPC ............ *C02F 1/008* (2013.01); *C02F 2209/005* (2013.01); *C02F 2209/008* (2013.01)
USPC ................. 700/266; 702/30; 702/31; 702/32; 702/81; 702/82; 702/83; 702/84; 702/184; 205/742; 205/743; 205/744; 210/85; 210/739

(58) Field of Classification Search
CPC ............... C02F 1/008; C02F 2209/005; C02F 2209/008

USPC .................. 702/30–32, 81–84, 184; 700/266; 205/742–744; 210/85, 739
See application file for complete search history.

(56) References Cited

U.S. PATENT DOCUMENTS

| | | | |
|---|---|---|---|
| 4,626,992 A | 12/1986 | Greaves et al. | |
| 4,830,757 A | 5/1989 | Lynch et al. | |

(Continued)

FOREIGN PATENT DOCUMENTS

| | | |
|---|---|---|
| CA | 2283502 A1 | 9/1998 |
| EP | 0854839 | 7/1998 |

(Continued)

OTHER PUBLICATIONS

International Search Report and Written Opinion dated Jul. 10, 2012, in Application No. PCT/IB2011/055238.

(Continued)

*Primary Examiner* — Shogo Sasaki
(74) *Attorney, Agent, or Firm* — Miles & Stockbridge PC; James T. Carmichael

(57) ABSTRACT

The present invention provides a remote monitoring system for monitoring the operation of a fluid treatment system and/or the qualities, characteristics, properties, etc., of the fluid being processed or treated by the fluid treatment system. The system includes a remote computer that may be associated with a database that accesses data transmitted from the fluid treatment system with the data collected, acquired, etc., from one or more sensors placed in the fluid treatment system for measuring fluid quality and/or equipment operation in a fluid treatment system. The remote computer may then analyze or manipulate the data to generate an analysis result or analysis report that may be sent or communicated along with the data and/or any historical or expected information or data to a remote viewing device for viewing by a user. A method is further provided for the operation of the remote monitoring system of the present invention.

18 Claims, 2 Drawing Sheets

Related U.S. Application Data continuation-in-part of application No. 10/055,225, filed on Oct. 26, 2001, now Pat. No. 6,560,543, which is a continuation-in-part of application No. 09/213,781, filed on Dec. 17, 1998, now Pat. No. 6,332,110, application No. 12/565,091, which is a continuation-in-part of application No. 12/272,018, filed on Nov. 17, 2008, now Pat. No. 7,698,073, and a continuation-in-part of application No. 10/695,627, filed on Oct. 27, 2003, now Pat. No. 6,954,701, which is a continuation of application No. 10/392,112, filed on Mar. 19, 2003, now Pat. No. 7,454,295.

(56) References Cited

U.S. PATENT DOCUMENTS

| | | | |
|---|---|---|---|
| 5,227,038 A | 7/1993 | Smalley et al. | |
| 5,300,203 A | 4/1994 | Smalley | |
| 5,315,880 A | 5/1994 | Bailey | |
| 5,386,373 A | 1/1995 | Keeler et al. | |
| 5,451,314 A | 9/1995 | Neuenschwander | |
| 5,483,164 A | 1/1996 | Moss et al. | |
| 5,492,632 A | 2/1996 | Reber | |
| 5,494,573 A | 2/1996 | Schoenmeyer et al. | |
| 5,506,791 A | 4/1996 | Hungerford et al. | |
| 5,544,531 A | 8/1996 | Heckman | |
| 5,553,492 A | 9/1996 | Barrett et al. | |
| 5,556,517 A | 9/1996 | Smalley | |
| 5,591,312 A | 1/1997 | Smalley | |
| 5,608,171 A | 3/1997 | Hunter et al. | |
| 5,619,631 A | 4/1997 | Schott | |
| 5,631,744 A | 5/1997 | Takeuchi et al. | |
| 5,633,809 A | 5/1997 | Wissenbach et al. | |
| 5,644,088 A | 7/1997 | Heckman | |
| 5,646,863 A | 7/1997 | Morton | |
| 5,681,482 A | 10/1997 | Reber | |
| 5,691,914 A | 11/1997 | Randolph | |
| 5,739,376 A | 4/1998 | Bingel | |
| 5,754,451 A | 5/1998 | Williams | |
| 5,757,659 A | 5/1998 | Arai et al. | |
| 5,811,688 A | 9/1998 | Marsh et al. | |
| 5,826,029 A | 10/1998 | Gore et al. | |
| 5,832,410 A | 11/1998 | Lin et al. | |
| 5,835,724 A | 11/1998 | Smith | |
| 5,865,718 A | 2/1999 | Chan | |
| 5,867,483 A * | 2/1999 | Ennis et al. | 370/252 |
| 5,905,570 A | 5/1999 | White et al. | |
| 5,960,404 A | 9/1999 | Chaar et al. | |
| 5,970,426 A | 10/1999 | Mandel et al. | |
| 5,993,662 A | 11/1999 | Garr et al. | |
| 5,997,750 A | 12/1999 | Rozelle et al. | |
| 6,023,223 A | 2/2000 | Baxter, Jr. | |
| 6,061,603 A | 5/2000 | Papadopoulos et al. | |
| 6,064,148 A | 5/2000 | Tait et al. | |
| 6,097,995 A | 8/2000 | Tipton et al. | |
| 6,115,693 A | 9/2000 | McDonough et al. | |
| 6,129,901 A | 10/2000 | Moskovits et al. | |
| 6,149,775 A | 11/2000 | Tsuboi et al. | |
| 6,162,926 A | 12/2000 | Murphy et al. | |
| 6,167,376 A | 12/2000 | Ditzik | |
| 6,183,714 B1 | 2/2001 | Smalley et al. | |
| 6,208,943 B1 | 3/2001 | Randolph et al. | |
| 6,222,839 B1 | 4/2001 | Nakazaki et al. | |
| 6,265,466 B1 | 7/2001 | Glatkowski et al. | |
| 6,305,944 B1 | 10/2001 | Henry et al. | |
| 6,317,639 B1 | 11/2001 | Hansen | |
| 6,332,110 B1 | 12/2001 | Wolfe | |
| 6,346,023 B1 | 2/2002 | Tsuboi et al. | |
| 6,356,205 B1 | 3/2002 | Salvo et al. | |
| 6,359,444 B1 | 3/2002 | Grimes | |
| 6,370,448 B1 | 4/2002 | Eryurek | |
| 6,389,331 B1 | 5/2002 | Jensen et al. | |
| 6,399,785 B1 | 6/2002 | Murphy et al. | |
| 6,401,526 B1 | 6/2002 | Dal et al. | |
| 6,448,412 B1 | 9/2002 | Murphy et al. | |
| 6,463,352 B1 | 10/2002 | Tadokoro et al. | |
| 6,493,208 B1 | 12/2002 | Piche et al. | |
| 6,509,619 B1 | 1/2003 | Kendall et al. | |
| 6,530,160 B1 | 3/2003 | Gookins | |
| 6,538,153 B1 | 3/2003 | Hirsch et al. | |
| 6,560,543 B2 | 5/2003 | Wolfe et al. | |
| 6,577,988 B1 | 6/2003 | Travagline et al. | |
| 6,606,566 B1 | 8/2003 | Sunshine | |
| 6,618,709 B1 | 9/2003 | Sneeringer | |
| 6,645,455 B2 | 11/2003 | Margrave et al. | |
| 6,659,861 B1 | 12/2003 | Faris et al. | |
| 6,672,077 B1 | 1/2004 | Bradley et al. | |
| 6,673,314 B1 | 1/2004 | Burbank et al. | |
| 6,675,127 B2 * | 1/2004 | LaBlanc et al. | 702/181 |
| 6,683,783 B1 | 1/2004 | Smalley et al. | |
| 6,692,717 B1 | 2/2004 | Smalley et al. | |
| 6,712,864 B2 | 3/2004 | Horiuchi et al. | |
| 6,725,250 B1 | 4/2004 | Ellis, III | |
| 6,743,408 B2 | 6/2004 | Lieber et al. | |
| 6,748,748 B2 | 6/2004 | Bradley et al. | |
| 6,749,827 B2 | 6/2004 | Smalley et al. | |
| 6,752,977 B2 | 6/2004 | Smalley et al. | |
| 6,756,025 B2 | 6/2004 | Colbert et al. | |
| 6,756,026 B2 | 6/2004 | Colbert et al. | |
| 6,762,237 B2 | 7/2004 | Glatkowski et al. | |
| 6,790,425 B1 | 9/2004 | Smalley et al. | |
| 6,811,457 B2 | 11/2004 | Cheng et al. | |
| 6,824,755 B2 | 11/2004 | Colbert et al. | |
| 6,827,918 B2 | 12/2004 | Margrave et al. | |
| 6,830,679 B2 | 12/2004 | Tsuihiji et al. | |
| 6,836,737 B2 | 12/2004 | Petite et al. | |
| 6,845,336 B2 | 1/2005 | Kodukkula et al. | |
| 6,847,739 B2 | 1/2005 | Jostschulte | |
| 6,852,410 B2 | 2/2005 | Veedu et al. | |
| 6,858,197 B1 | 2/2005 | Delzeit | |
| 6,863,942 B2 | 3/2005 | Ren et al. | |
| 6,872,330 B2 | 3/2005 | Mack et al. | |
| 6,875,412 B2 | 4/2005 | Margrave et al. | |
| 6,885,309 B1 | 4/2005 | Van Heteren | |
| 6,890,506 B1 | 5/2005 | Harutyunyan et al. | |
| 6,899,945 B2 | 5/2005 | Smalley et al. | |
| 6,900,264 B2 | 5/2005 | Kumar et al. | |
| 6,904,054 B1 | 6/2005 | Baum et al. | |
| 6,913,789 B2 | 7/2005 | Smalley et al. | |
| 6,921,575 B2 | 7/2005 | Horiuchi et al. | |
| 6,936,233 B2 | 8/2005 | Smalley et al. | |
| 6,936,653 B2 | 8/2005 | McElrath et al. | |
| 6,939,525 B2 | 9/2005 | Colbert et al. | |
| 6,947,427 B1 | 9/2005 | Rokugo et al. | |
| 6,949,237 B2 | 9/2005 | Smalley et al. | |
| 6,954,701 B2 | 10/2005 | Wolfe | |
| 6,961,641 B1 | 11/2005 | Forth et al. | |
| 6,969,504 B2 | 11/2005 | Smalley et al. | |
| 6,978,212 B1 | 12/2005 | Sunshine | |
| 6,979,709 B2 | 12/2005 | Smalley et al. | |
| 6,986,853 B2 | 1/2006 | Glatkowski et al. | |
| 6,988,925 B2 | 1/2006 | Arthur et al. | |
| 7,008,563 B2 | 3/2006 | Smalley et al. | |
| 7,008,604 B2 | 3/2006 | Smalley et al. | |
| 7,014,737 B2 | 3/2006 | Harutyunyan et al. | |
| 7,029,646 B2 | 4/2006 | Margrave et al. | |
| 7,036,324 B2 | 5/2006 | Bradley et al. | |
| 7,041,620 B2 | 5/2006 | Smalley et al. | |
| 7,048,999 B2 | 5/2006 | Smalley et al. | |
| 7,049,353 B2 | 5/2006 | Conroy et al. | |
| 7,052,666 B2 | 5/2006 | Colbert et al. | |
| 7,052,668 B2 | 5/2006 | Smalley et al. | |
| 7,058,154 B1 | 6/2006 | Stark et al. | |
| 7,060,241 B2 | 6/2006 | Glatkowski | |
| 7,061,749 B2 | 6/2006 | Liu et al. | |
| 7,067,098 B2 | 6/2006 | Colbert et al. | |
| 7,070,651 B1 | 7/2006 | Tolt et al. | |
| 7,070,754 B2 | 7/2006 | Smalley et al. | |
| 7,070,810 B2 | 7/2006 | Hirsch et al. | |
| 7,074,310 B2 | 7/2006 | Smalley et al. | |
| 7,076,871 B2 | 7/2006 | Horiuchi et al. | |
| 7,085,938 B1 | 8/2006 | Pozzuoli et al. | |
| 7,087,207 B2 | 8/2006 | Smalley et al. | |
| 7,090,819 B2 | 8/2006 | Smalley et al. | |

(56) References Cited

U.S. PATENT DOCUMENTS

| | | |
|---|---|---|
| 7,094,679 B1 | 8/2006 | Li et al. |
| 7,108,841 B2 | 9/2006 | Smalley et al. |
| 7,118,693 B2 | 10/2006 | Glatkowski et al. |
| 7,121,158 B2 | 10/2006 | Scott et al. |
| 7,176,877 B2 | 2/2007 | Tikhonski et al. |
| 7,179,561 B2 | 2/2007 | Niu et al. |
| 7,182,914 B2 | 2/2007 | Lai et al. |
| 7,189,314 B1 | 3/2007 | Pace et al. |
| 7,189,430 B2 | 3/2007 | Ajayan et al. |
| 7,195,754 B1 | 3/2007 | Glatkowski et al. |
| 7,204,970 B2 | 4/2007 | Smalley et al. |
| 7,217,650 B1 | 5/2007 | Ng et al. |
| 7,227,140 B2 | 6/2007 | Skidmore et al. |
| 7,250,148 B2 | 7/2007 | Yang et al. |
| 7,276,266 B1 | 10/2007 | Khare et al. |
| 7,282,191 B1 | 10/2007 | Choi et al. |
| 7,285,198 B2 | 10/2007 | Douglas |
| 7,303,875 B1 | 12/2007 | Bock et al. |
| 7,338,648 B2 | 3/2008 | Harutyunyan et al. |
| 7,338,915 B1 | 3/2008 | Smalley et al. |
| 7,342,479 B2 | 3/2008 | Glatkowski et al. |
| 7,342,506 B2 | 3/2008 | Paoli et al. |
| 7,345,307 B2 | 3/2008 | Pan et al. |
| 7,354,563 B2 | 4/2008 | Smalley et al. |
| 7,357,906 B2 | 4/2008 | Colbert et al. |
| 7,357,983 B2 | 4/2008 | Pfefferle et al. |
| 7,365,395 B2 | 4/2008 | Stumbo et al. |
| 7,378,040 B2 | 5/2008 | Luo et al. |
| 7,390,477 B2 | 6/2008 | Smalley et al. |
| 7,390,767 B2 | 6/2008 | Smalley et al. |
| 7,426,848 B1 | 9/2008 | Li et al. |
| 7,428,046 B2 | 9/2008 | Wang et al. |
| 7,452,735 B2 | 11/2008 | Li et al. |
| 7,454,295 B2 | 11/2008 | Wolfe |
| 7,465,494 B2 | 12/2008 | Ren et al. |
| 7,466,533 B2 | 12/2008 | Chow et al. |
| 7,468,315 B2 | 12/2008 | Buretea et al. |
| 7,470,620 B2 | 12/2008 | Dubin et al. |
| 7,473,411 B2 | 1/2009 | Ajayan et al. |
| 7,473,436 B1 | 1/2009 | Khare et al. |
| 7,479,240 B2 | 1/2009 | Jhi et al. |
| 7,514,369 B2 | 4/2009 | Li et al. |
| 7,515,333 B1 | 4/2009 | Empedocles |
| 7,522,040 B2 | 4/2009 | Passmore et al. |
| 7,553,371 B2 | 6/2009 | Dubrow et al. |
| 7,553,471 B2 | 6/2009 | Ohashi et al. |
| 7,557,028 B1 | 7/2009 | Scher et al. |
| 7,560,134 B2 | 7/2009 | Yaniv et al. |
| 7,560,136 B2 | 7/2009 | Ward et al. |
| 7,560,366 B1 | 7/2009 | Romano et al. |
| 7,563,722 B2 | 7/2009 | Yaniv et al. |
| 7,566,945 B2 | 7/2009 | Choi et al. |
| 7,569,503 B2 | 8/2009 | Pan et al. |
| 7,575,720 B2 | 8/2009 | Novak et al. |
| 7,575,933 B2 | 8/2009 | Gabriel et al. |
| 7,581,645 B2 | 9/2009 | Ho et al. |
| 7,595,528 B2 | 9/2009 | Duan et al. |
| 7,596,415 B2 | 9/2009 | Brabec et al. |
| 7,597,788 B2 | 10/2009 | Visel et al. |
| 7,611,740 B2 | 11/2009 | Jiang et al. |
| 7,611,906 B2 | 11/2009 | Yaniv |
| 7,623,972 B1 | 11/2009 | Li et al. |
| 7,628,974 B2 | 12/2009 | Grill et al. |
| 7,630,227 B2 | 12/2009 | Tran |
| 7,632,548 B2 | 12/2009 | Yaniv |
| 7,635,503 B2 | 12/2009 | Dominguez et al. |
| 7,641,938 B2 | 1/2010 | Liu et al. |
| 7,645,397 B2 | 1/2010 | Parce et al. |
| 7,647,813 B2 | 1/2010 | Pavlovsky |
| 7,651,769 B2 | 1/2010 | Dubrow |
| 7,651,944 B2 | 1/2010 | Duan et al. |
| 7,652,418 B2 | 1/2010 | Choi et al. |
| 7,655,497 B1 | 2/2010 | Yu et al. |
| 7,667,296 B2 | 2/2010 | Stumbo et al. |
| 7,687,981 B2 | 3/2010 | Parsapour |
| 7,691,720 B2 | 4/2010 | Furukawa et al. |
| 7,695,609 B2 | 4/2010 | Soundarrajan et al. |
| 7,696,272 B2 | 4/2010 | Li et al. |
| 7,698,073 B2 | 4/2010 | Wolfe |
| 7,701,014 B2 | 4/2010 | Mostarshed et al. |
| 7,701,428 B2 | 4/2010 | Stumbo et al. |
| 7,704,479 B2 | 4/2010 | Rinzler et al. |
| 7,704,547 B1 | 4/2010 | Delzeit et al. |
| 7,714,386 B2 | 5/2010 | Pesetski et al. |
| 7,714,398 B2 | 5/2010 | Ben-Barak et al. |
| 7,728,520 B2 | 6/2010 | Yaniv et al. |
| 7,736,209 B2 | 6/2010 | Mao et al. |
| 7,736,979 B2 | 6/2010 | Farrow et al. |
| 7,741,197 B1 | 6/2010 | Duan et al. |
| 7,745,498 B2 | 6/2010 | Pereira et al. |
| 7,749,477 B2 | 7/2010 | Jiang et al. |
| 7,750,235 B2 | 7/2010 | Scher et al. |
| 7,754,524 B2 | 7/2010 | Dubrow et al. |
| 7,755,038 B2 | 7/2010 | Niu et al. |
| 7,755,115 B2 | 7/2010 | Awano |
| 7,762,121 B2 | 7/2010 | Ng et al. |
| 7,767,067 B2 | 8/2010 | Silveri |
| 7,767,102 B2 | 8/2010 | Lemmi et al. |
| 7,767,270 B1 | 8/2010 | Khare et al. |
| 7,776,758 B2 | 8/2010 | Duan et al. |
| 7,776,760 B2 | 8/2010 | Taylor |
| 7,782,462 B2 | 8/2010 | Pavlovsky |
| 7,784,531 B1 | 8/2010 | Li et al. |
| 7,785,922 B2 | 8/2010 | Robbins |
| 7,786,024 B2 | 8/2010 | Stumbo et al. |
| 7,786,402 B2 | 8/2010 | Fink et al. |
| 7,791,258 B2 | 9/2010 | Yaniv et al. |
| 7,794,600 B1 | 9/2010 | Buretea et al. |
| 7,795,125 B2 | 9/2010 | Buretea et al. |
| 7,801,687 B1 | 9/2010 | Li et al. |
| 8,504,305 B2 | 8/2013 | Wolfe |
| 8,577,623 B2 | 11/2013 | Wolfe |
| 2001/0020195 A1 | 9/2001 | Patel et al. |
| 2001/0053992 A1 | 12/2001 | Eto et al. |
| 2001/0055978 A1 | 12/2001 | Herrod et al. |
| 2002/0023479 A1 | 2/2002 | Burge et al. |
| 2002/0130069 A1 | 9/2002 | Moskoff |
| 2002/0133270 A1 | 9/2002 | Hung et al. |
| 2003/0052585 A1 | 3/2003 | Guillorn et al. |
| 2003/0089899 A1 | 5/2003 | Lieber et al. |
| 2003/0124717 A1 | 7/2003 | Awano et al. |
| 2003/0174070 A1 | 9/2003 | Garrod et al. |
| 2003/0207326 A1 | 11/2003 | Su et al. |
| 2004/0026684 A1 | 2/2004 | Empedocles |
| 2004/0066313 A1 | 4/2004 | Ong et al. |
| 2004/0117731 A1 | 6/2004 | Blyashov |
| 2004/0132070 A1 | 7/2004 | Star et al. |
| 2004/0136866 A1 | 7/2004 | Pontis et al. |
| 2004/0245209 A1 | 12/2004 | Jung et al. |
| 2005/0046017 A1 | 3/2005 | Dangelo |
| 2005/0136483 A1 | 6/2005 | Carlson |
| 2005/0186333 A1 | 8/2005 | Douglas |
| 2005/0221473 A1 | 10/2005 | Dubin et al. |
| 2005/0224220 A1 | 10/2005 | Li et al. |
| 2005/0269285 A1 | 12/2005 | Jung et al. |
| 2005/0273424 A1* | 12/2005 | Silverman et al. .............. 705/39 |
| 2006/0014155 A1 | 1/2006 | Hamers et al. |
| 2006/0078468 A1 | 4/2006 | Gabriel et al. |
| 2006/0112983 A1 | 6/2006 | Parce et al. |
| 2006/0124028 A1 | 6/2006 | Huang et al. |
| 2006/0240218 A1 | 10/2006 | Parce |
| 2006/0257637 A1 | 11/2006 | Pereira et al. |
| 2006/0275914 A1 | 12/2006 | Henley et al. |
| 2006/0287906 A1* | 12/2006 | McGillin .......................... 705/9 |
| 2007/0044295 A1 | 3/2007 | Chen |
| 2007/0045128 A1 | 3/2007 | Krathefer et al. |
| 2007/0132043 A1 | 6/2007 | Bradley et al. |
| 2007/0140930 A1 | 6/2007 | Novak et al. |
| 2007/0155064 A1 | 7/2007 | Chen et al. |
| 2007/0163965 A1 | 7/2007 | Wolfe |
| 2007/0238209 A1 | 10/2007 | Yaniv et al. |
| 2007/0246364 A1 | 10/2007 | Amlani et al. |
| 2008/0035481 A1 | 2/2008 | McCormack et al. |
| 2008/0142361 A1 | 6/2008 | Han et al. |

(56) References Cited

U.S. PATENT DOCUMENTS

| | | |
|---|---|---|
| 2008/0150009 A1 | 6/2008 | Chen |
| 2008/0152839 A1 | 6/2008 | Han et al. |
| 2008/0221806 A1 | 9/2008 | Bryant et al. |
| 2008/0237540 A1 | 10/2008 | Dubrow |
| 2008/0246076 A1 | 10/2008 | Chen |
| 2008/0280069 A1 | 11/2008 | Parce et al. |
| 2008/0280780 A1 | 11/2008 | Hamers et al. |
| 2009/0035570 A1 | 2/2009 | Mao et al. |
| 2009/0045061 A1 | 2/2009 | Farrow et al. |
| 2009/0058431 A1 | 3/2009 | Dass et al. |
| 2009/0072192 A1 | 3/2009 | Seal et al. |
| 2009/0095704 A1 | 4/2009 | Mao et al. |
| 2009/0123343 A1 | 5/2009 | Kwiatkowski |
| 2009/0124025 A1 | 5/2009 | Hamilton et al. |
| 2009/0138240 A1 | 5/2009 | Wolfe |
| 2009/0192429 A1 | 7/2009 | Daniels et al. |
| 2009/0198117 A1 | 8/2009 | Cooper et al. |
| 2009/0230380 A1 | 9/2009 | Leon et al. |
| 2009/0242429 A1 | 10/2009 | Sitdikov et al. |
| 2009/0242854 A1 | 10/2009 | Li et al. |
| 2009/0252886 A1 | 10/2009 | Barker et al. |
| 2009/0261186 A1 | 10/2009 | Fink et al. |
| 2009/0274833 A1 | 11/2009 | Li et al. |
| 2009/0278556 A1 | 11/2009 | Man et al. |
| 2009/0286383 A1 | 11/2009 | Jiang et al. |
| 2009/0325370 A1 | 12/2009 | Yang et al. |
| 2010/0000762 A1 | 1/2010 | Yang et al. |
| 2010/0055349 A1 | 3/2010 | Gaitas et al. |
| 2010/0062178 A1 | 3/2010 | Zhang et al. |
| 2010/0068406 A1 | 3/2010 | Man |
| 2010/0072429 A1 | 3/2010 | Rajala et al. |
| 2010/0089122 A1 | 4/2010 | Abdullah et al. |
| 2010/0102245 A1 | 4/2010 | Jiang et al. |
| 2010/0104808 A1 | 4/2010 | Fan et al. |
| 2010/0116666 A1 | 5/2010 | Park et al. |
| 2010/0127167 A1 | 5/2010 | Schropp, Jr. et al. |
| 2010/0140213 A1 | 6/2010 | Mizukami et al. |
| 2010/0143234 A1 | 6/2010 | Kajiura et al. |
| 2010/0153021 A1 | 6/2010 | Wolfe |
| 2010/0167011 A1 | 7/2010 | Dubrow |
| 2010/0167512 A1 | 7/2010 | Pan et al. |
| 2010/0173228 A1 | 7/2010 | Wallace et al. |
| 2010/0204924 A1 | 8/2010 | Wolfe |
| 2010/0332149 A1 | 12/2010 | Scholpp |
| 2011/0125412 A1 | 5/2011 | Salzer et al. |
| 2012/0125771 A1 | 5/2012 | Salzer et al. |
| 2013/0009781 A1 | 1/2013 | Wolfe |
| 2013/0073611 A1 | 3/2013 | Wolfe |

FOREIGN PATENT DOCUMENTS

| | | |
|---|---|---|
| EP | 1404908 B1 | 11/2007 |
| EP | 1864122 | 12/2007 |
| EP | 1623437131 | 12/2007 |
| EP | 1954387 | 8/2008 |
| EP | 1976431 | 10/2008 |
| EP | 1836104 B1 | 1/2009 |
| EP | 2018549 | 1/2009 |
| EP | 2047531 | 4/2009 |
| EP | 2083928 | 8/2009 |
| EP | 1556878 B1 | 4/2010 |
| JP | 3958792 B2 | 8/2007 |
| JP | 3962376 B2 | 8/2007 |
| JP | 2008/260073 | 10/2008 |
| JP | 4381428 B2 | 12/2009 |
| WO | WO 97/09272 A1 | 3/1997 |
| WO | WO 00/36412 A1 | 6/2000 |
| WO | WO 01/80494 | 10/2001 |
| WO | WO 03/024798 A1 | 3/2003 |
| WO | WO 03/038685 A2 | 5/2003 |
| WO | WO 03/050036 A1 | 6/2003 |
| WO | WO 03/078317 A1 | 9/2003 |
| WO | WO 2004/024407 A1 | 3/2004 |
| WO | WO 2004/052559 A2 | 6/2004 |
| WO | WO 2004/069737 A2 | 8/2004 |
| WO | WO 2004/097853 A1 | 11/2004 |
| WO | WO 2005/022120 A2 | 3/2005 |
| WO | WO 2005/079202 A2 | 9/2005 |
| WO | WO 2005/086982 A2 | 9/2005 |
| WO | WO 2005/110624 A2 | 11/2005 |
| WO | WO 2006/069458 A1 | 7/2006 |
| WO | WO 2006/073420 A2 | 7/2006 |
| WO | WO 2006/078286 A2 | 7/2006 |
| WO | WO 2006/102064 A2 | 9/2006 |
| WO | WO 2007/024697 A2 | 3/2007 |
| WO | WO 2007/067922 A2 | 6/2007 |
| WO | WO 2007/106836 A2 | 9/2007 |
| WO | WO 2007/124612 A2 | 11/2007 |
| WO | WO 2008/051205 A2 | 5/2008 |
| WO | WO 2008/057615 A2 | 5/2008 |
| WO | WO 2008/076473 A2 | 6/2008 |
| WO | WO 2008/091402 A2 | 7/2008 |
| WO | WO 2008/060455 A3 | 11/2008 |
| WO | WO 2008/143714 A2 | 11/2008 |
| WO | WO 2009/011450 A1 | 1/2009 |
| WO | WO 2009/023061 A2 | 2/2009 |
| WO | WO 2009/042079 A2 | 4/2009 |
| WO | WO 2008/106426 A9 | 10/2009 |
| WO | WO 2008/150336 A2 | 10/2009 |
| WO | WO 2010/003212 A1 | 1/2010 |
| WO | WO 2010/048405 A1 | 4/2010 |
| WO | WO 2010/048407 A1 | 4/2010 |
| WO | WO 2010/056826 A1 | 5/2010 |
| WO | WO 2010/077226 A1 | 7/2010 |
| WO | WO 2010/093703 A1 | 8/2010 |
| WO | WO 2010/096035 A1 | 8/2010 |
| WO | WO 2012/069993 A2 | 5/2012 |
| WO | WO 2012/069992 A2 | 9/2012 |

OTHER PUBLICATIONS

International Search Report and Written Opinion dated Aug. 30, 2012, in Application No. PCT/IB2011/055240.

Ardakan, Mohammad Mazloum et al.,: "Novel Coated-Wire Membrane Sensor Based on Bis(Acetylacetonato) Cadmium(II) for the Determination of Chromate Ions"; Department of Chemistry, Faculty of Science, Kashan University, Kashan, Iran; received Jul. 24, 2004; accepted Nov. 16, 2004; published online Mar. 21, 2005 © Springer-Verlag 2005.

Schuler, R. et al., Modified gas-permeable silicone rubber membranes for covalent immobilization of enzymes and their use in biosensor development ICB, Institut fur Chemo- und Biosensorik, eV, Mendelstrasse 7, D-48149 Munster, Germany, received Apr. 13, 1999, accepted Jun. 18, 1999.

Faridbod, Farmoush et al.; "The fabrication of potentiometric membrane sensors and their applications"; Tehran, P.O. Box 14155-6451, Iran, accepted Nov. 12, 2007; African Journal of Biotechnology vol. 6 (25), pp. 2960-2987, Dec. 28, 2007. Available online at http://www.academicjournals.org/AJ; ISSN 1684-5315 © 2007 Academic Journals.

Zbignlew, Moron, "Considerations on the Accuracy of Measurements of Electrical Conductivity of Liquids" Department of Biomedical Engineering and Instrumentation, Wroclaw University of Technology, Wroclase, Poland, XVIII Imeko World Congress Metrology for a Sustainable Development, Sep. 17-22, 2006, Rio de Janeiro, Brazil.

Heng, Lee Yook et al., "Producing "Self-Plasticizing" Ion-Selective Membranes", Institute of Biotechnology, University of Cambridge, Tennis Court Road, Cambridge CB2 1QT, U.K. Anal. Chem. 2000, 72, 42-51.

Pretsch, Erno et al., "Design features of ionophores for ion selective electrodes", Department of Organic Chemistry, Swiss Federal Institute of Technology (ETH), Universitatstrasse 16, CH-8092 Zurich, Switzerland, Pure & Appl. Chem., vol. 60, No. 4, pp. 567-574, 1988, printed in Great Britain © 1998 IUPAC.

Cycliax, Ingo, "Remote Internet Data Logging and Sensing", Circuit Cellar Magazine, Embedded PC, PC/104 Quarter104, Nov. 1997, pp. 53-59.

(56) References Cited

OTHER PUBLICATIONS

McKinnon, et al., "Automating Communications with and Developing User Interfaces for Remote data Acquisition and Analysis Systems", IEEE Transactions on Nuclear Science, vol. 44, No. 3, Jun. 1997, pp. 1062-1064.
Franklin, et al., "Data in Your Face": Push Technology in Perspective, S., SIGMOD Record, vol. 27, Issue 2, Jun. 1998, pp. 516-519.
Soreide, et al., "Mosaic Access to Realtime Data from the TOGA-TAO array of moored buoys", accessed from web site Equatorial Pacific, Oct. 16, 2002, pp. 1-8.
Northwest Fisheries Science Center, National Marine Fisheries Service (NOAA), "Water Recirculation Project", accessed from web site NWFSC:Aquaculture-Water Recirculation Project, Oct. 16, 2002, pp. 1-3.
Northwest Fisheries Science Center, "NWFSC Water Recirculation Project: Data Acquisition and Web Display", accessed from web site NWFSC Web Template, Oct. 16, 2002, pp. 1-3.
Scott, et al., "A Computer Automated Cold Water Recirculating System for Aquaculture Research", accessed from web U.S. Dept. Commerce/NOAA/NMFS/NWFSC, Oct. 16, 2002, pp. 1-9.
Remote Measurement Systems, "Case Studies", accessed from web site Remote Measurement Systems—Case Studies: Fisheries, Oct. 16, 2002, pp. 1-4.
Remote Measurement Systems, "Posting Real-Time Measurement to the Web", Home Energy, accessed from web site Posting Real-Time Measurements to Web Pages, Oct. 16, 2002, pp. 1-5.
Liu et al., Carbon Nanotube in Biology and Medicine: In vitro and in vivo Detection, Imaging and Drug Delivery; Nano Res., Vole 2, pp. 85-120 (2009).
Buhrer, Thomas, "Neutral-Carrier-Based Ion-Selective Microelectrodes Design and Application, A Review", Department of Organic Chemistry, Swiss Federal Institute of Technology, Zurich, Switzerland, Analytical Sciences, Dec. 1988, vol. 4, pp. 547-557.
Tzeng et al., "Hydration Properties of Carbon Nanotubes and Their Effects on Electrical and Biosensor Applications", New Diamond and Frontier Carbon Technology, vol. 14, No. 3, 2004, pp. 193-201.
Lumb Alan M. et al., "Users Manual for an Expert System (HSPEXP) for Calibration of the Hydrological Simulation Program—Fortran", U.S. Geological Survey, Water-Resources Investigations Report 94-4168, 1994, 106 pages.
Johnston et al., "Management, Operation and Maintenance of Irrigation and Drainage Systems", Second Edition, ASCE Manuals and Reports on Engineering Practice No. 57, American Society of Civil Engineers, 1991, 13 pages.
Nonfinal Office Action dated Jan. 31, 2013, in U.S. Appl. No. 13/619,880.
Nonfinal Office Action dated Mar. 4, 2013, in U.S. Appl. No. 13/619,775.
Nonfinal Office Action dated Mar. 5, 2013, in U.S. Appl. No. 13/620,000.
International Preliminary Report on Patentability dated Jun. 6, 2013, in PCT/IB2011/055240.
International Preliminary Report on Patentability dated Jun. 6, 2013, in PCT/IB2011/055238.
Final Rejection dated Jul. 19, 2013, in U.S. Appl. No. 13/619,880.
Notice of Allowance dated Aug. 7, 2013, in U.S. Appl. No. 13/619,775.
Final Rejection dated Sep. 13, 2013, in U.S. Appl. No. 12/952,566.
Nonfinal Office Action dated Sep. 13, 2013, in U.S. Appl. No. 11/331,721.
Final Rejection dated Sep. 26, 2013, in U.S. Appl. No. 12/952,392.
Nonfinal Office Action dated Nov. 19, 2013, in U.S. Appl. No. 13/619,880.
Nonfinal Office Action dated Jan. 16, 2014, in U.S. Appl. No. 13/620,000.
Final Rejection dated May 7, 2014 in U.S. Appl. No. 11/331,721.
Final Rejection dated May 15, 2014, in U.S. Appl. No. 13/619,880.
Nonfinal Office Action dated Jul. 30, 2014, in U.S. Appl. No. 13/620,000.

* cited by examiner

METHOD AND SYSTEM FOR REMOTE MONITORING OF FLUID QUALITY AND TREATMENT

CROSS-REFERENCE TO RELATED APPLICATIONS

This application is a continuation-in-part of U.S. patent application Ser. No. 11/331,721, filed Jan. 13, 2006, which is a continuation-in-part of U.S. patent application Ser. No. 10/392,112 filed Mar. 19, 2003, now U.S. Pat. No. 7,454,295, which is a continuation-in-part of U.S. patent application Ser. No. 10/055,225 filed Oct. 26, 2001, now U.S. Pat. No. 6,560,543, which is a continuation-in-part of U.S. patent application Ser. No. 09/213,781 filed Dec. 17, 1998, now U.S. Pat. No. 6,332,110. This application is also a continuation-in-part of U.S. patent application Ser. No. 12/272,018 filed Nov. 17, 2008 now U.S. Pat. No. 7,698,073, and U.S. patent application Ser. No. 10/695,627 filed Oct. 27, 2003, now U.S. Pat. No. 6,954,701, which is a continuation application of U.S. patent application Ser. No. 10/392,112 filed Mar. 19, 2003, now U.S. Pat. No. 7,454,295. The entire contents and disclosures of each of the above applications/patents are hereby incorporated by reference.

FIELD OF THE INVENTION

The present invention relates to the field of fluid treatment and safety, and in particular, to a method and system allowing remote monitoring and/or storage of fluid treatment and safety data.

BACKGROUND

It is well recognized that many aspects of manufacturing, as well as life itself, is dependant upon water. Water may be characterized by the amount of cations and anions, metals, turbidity, dissolved solids, and so forth, all of which combine to form unique water chemistries. Technology provides the ability to adjust, reduce, or remove such qualities to effectively prepare water for use in a particular application. Proper water treatment systems provide an economical way of conditioning water to a predetermined quality level as required for the particular application. Protection of water supplies from system or equipment failure as well as inadvertent or deliberate contamination are important concerns. While devices and methods exist to analyze water for contaminants, widespread deployment of such devices is expensive and difficult.

Many processes and applications require the use of water having sufficiently low or absent levels of contaminants or harmful substances, and thus rely on the use of water treatment systems to ensure adequate levels of water purity, quality, and/or safety. These water treatment systems may generally use techniques, such as advanced separation, filtration, reverse osmosis, and/or ion exchange processes, as well as the introduction of materials or disinfectants to achieve the desired water quality. However, equipment failure or tampering of these systems may result in poor or unsafe water quality for a given application. Therefore, it is critical that any water treatment system used to purify or treat water for any such applications is adequately monitored to ensure that the desired levels of water purity, quality, and/or safety are met. One application in which water quality is important is in providing potable drinking water to the public. Most water treatment systems for the production and distribution of drinking water to the public rely, for example, on the introduction and maintenance of materials, such as disinfectants, into the water system to protect against biological or chemical contamination. Chlorine, in the form of gas or hypochlorite or hypochlorous acid, is one of the most common materials used for this purpose. Substitutes such as chloramines, ozone, hydrogen peroxide, peracetic acid, chlorine dioxide, and various mixed oxides are also used. Many of these materials have a more or less common mode of action. They rely on some sort of oxidation to effect the deactivation of biological organisms and the destruction of other organic compounds present in the water to be treated. The reaction rates of the various materials, such as disinfectant compounds, are reasonably well known and well characterized. However, excessive amounts of these materials may cause problems on their own. Thus, it is important that adequate monitoring is performed to ensure that sufficient but not excessive amounts of these materials or disinfectants are maintained in a water treatment system.

Municipal drinking water may be obtained from a variety of sources, which can be made potable by use of proper water treatment equipment. For example, a reverse osmosis system may be used to lower the total dissolved solids from sea water with minimal pretreatment to produce potable drinking water. Despite the sophistication of pretreatment of seawater, improper monitoring or operation can allow the seawater to quickly foul membranes. If fouling occurs, but is found quickly, the membranes may be cleaned, and water contamination and associated water treatment repairs may be averted. However, if the fouling is not detected quickly through proper monitoring, the membranes can be irreparably damaged, and expensive partial or total membrane replacement would be required. The cost of unplanned membrane replacement, not including the lost revenues typically associated with down time, can make such a system cost prohibitive.

Another application in which water quality is important is with Waste Water Treatment Plants (WWTP). The treatment and subsequent recycling of wastewater is a cornerstone of the quality of life in the industrialized world. Cities, industries, and agricultural operations produce large quantities of wastewater, all of which must be treated to some degree to remove contaminants or pollutants before the water is suitable for recycling or discharge into the environment, such as streams, rivers or oceans. In metropolitan areas, central waste water treatment plants must treat water from a variety of sources including city, industrial, and agricultural waste water. In many cases, generators of industrial waste water are required to install and operate waste water treatment plants at their own sites before discharge into central water collection systems. At the central water collection system, industrial wastes may generally be mixed with domestic or city waste water and other untreated waste sources. These mixed wastes are then transported to the central waste water plant or sewage treatment facility for final treatment before discharge.

Increasingly, the need for pure water is causing more and more municipalities to install waste water recovery processes to recycle municipal WWTP effluents back into water of suitable quality to be used for potable drinking water or irrigation. For example, such recovery processes may recover secondary treated municipal effluents using reverse osmosis, which may then be injected back into an aquifer. More and more of these installations are planned throughout the United States and the rest of the world.

One difficult aspect of treating municipal waste water effluent is that neither the flow rates nor the mix of contaminants are constant. This is particularly true for a municipal WWTP with collection systems that include a variety of industrial discharge sources in addition to the usual sanitary discharges from homes, businesses, schools, and so on. While the sanitary discharges are well characterized in terms of composition and treatability, the addition of industrial wastes means that the WWTP must plan for a wide variety of contaminants. In general, most WWTP systems cannot deal effectively with every situation. Even with excellent design and engineering, the large fluctuation in the type and quantity of contaminants reaching the WWTP often result in varying levels of effective treatment in the discharge from the WWTP. For a tertiary water recovery plant treating the effluent from the WWTP this can be particularly difficult since many contaminants are not readily removed even by processes such as reverse osmosis. In addition, certain contaminants can also foul reverse osmosis, ultrafiltration, and microfiltration membranes, causing loss of performance or membrane damage. Therefore, it is important that WWTPs are monitored to ensure that contaminants are properly removed before discharge or reuse back into the environment and to avoid damage to expensive equipment.

Although systems exist for the local monitoring of discrete, independent treatment site locations for individual analysis, these systems do not contemplate remote monitoring of one or a number of water treatments sites throughout a collection system that simultaneously feed effluents into a central water collection system of a WWTP. There remains a need for a system designed for remote monitoring of a WWTP which may collect and interpret data from one or a multiple number of remote industrial or water treatment sites viewed and analyzed as an aggregate water treatment system.

Water is also required for steam generation in nuclear reactors. The boilers of these nuclear reactors operate at extremely high temperatures which requires a very high quality of water. It is critical that the process system is monitored properly to avoid expensive boiler cleanings and the associated down time. Such systems may also include the need to monitor hazardous boiler chemicals, such as hydrazine, requiring highly qualified personnel. These examples highlight the importance of monitoring the operation of water treatment systems to not only ensure sufficient water quality, but also to avert costly equipment repair or replacement.

Water quality is also important for many manufacturing processes. For example, the manufacturing of semiconductors requires an ultra-pure water quality. Again, it is critical that the water treatment system is monitored properly to avoid latent defects in the manufacturing of products, such as semiconductors.

As yet another example, monitoring water quality is also important to avoid or lessen the consequences of equipment failure or deliberate tampering, such as by terrorist act, in contaminating the water supply. Adequate monitoring may help to catch any such contamination of the water supply to avoid harm and ensure that appropriate action is taken.

One of the problems with maintaining advanced processing equipment is the need for highly qualified individuals to monitor its operation. Employment of a full time staff is costly and can be problematic since such monitoring is repetitive, and highly qualified individuals can easily become bored. For this reason, advanced separation processes may include a large assortment of strategically placed sensors that are typically incorporated into a computer system capable of comparing the sensor values against a pre-set quality level. However, if the operator does not recognize a particular alarm condition, the elaborate array of monitoring equipment is effectively useless.

SUMMARY

According to a first broad aspect of the present invention, a remote monitoring system is provided the remote monitoring system comprising a remote computer having an analyzer, wherein the remote computer receives data from one or more sensors placed in a water treatment system, wherein the data is transmitted from the water treatment system to the remote computer using a mode of transmission, and wherein the remote computer uses the analyzer to manipulate the data and generate an output. The remote monitoring system may further comprise a database associated with the remote computer for storing the data and/or the manipulated data, and/or a local computer located at or near the water treatment system for reviewing the manipulated data.

According to a second broad aspect of the present invention, a method is provided comprising the following steps: (a) providing a remote computer of a remote monitoring system having an analyzer; (b) receiving data collected from one or more sensors in a water treatment system in the remote computer; and (c) generating an output based on manipulating the received data, wherein the received data is transmitted from the water treatment system to the remote computer using a mode of transmission, and wherein the remote computer uses the analyzer to manipulate the received data. The method may further comprise the step of (d) comparing the data by the analyzer on the remote computer, wherein step (d) is performed prior to step (c). The method may further comprise the step of (e) communicating the output to a remote viewing device using a mode of communication, wherein step (e) is performed after step (c). The method may further comprise the step of (f) storing the received data and/or the manipulated data in a database associated with the remote computer.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

DETAILED DESCRIPTION

Definitions

Figure 1:
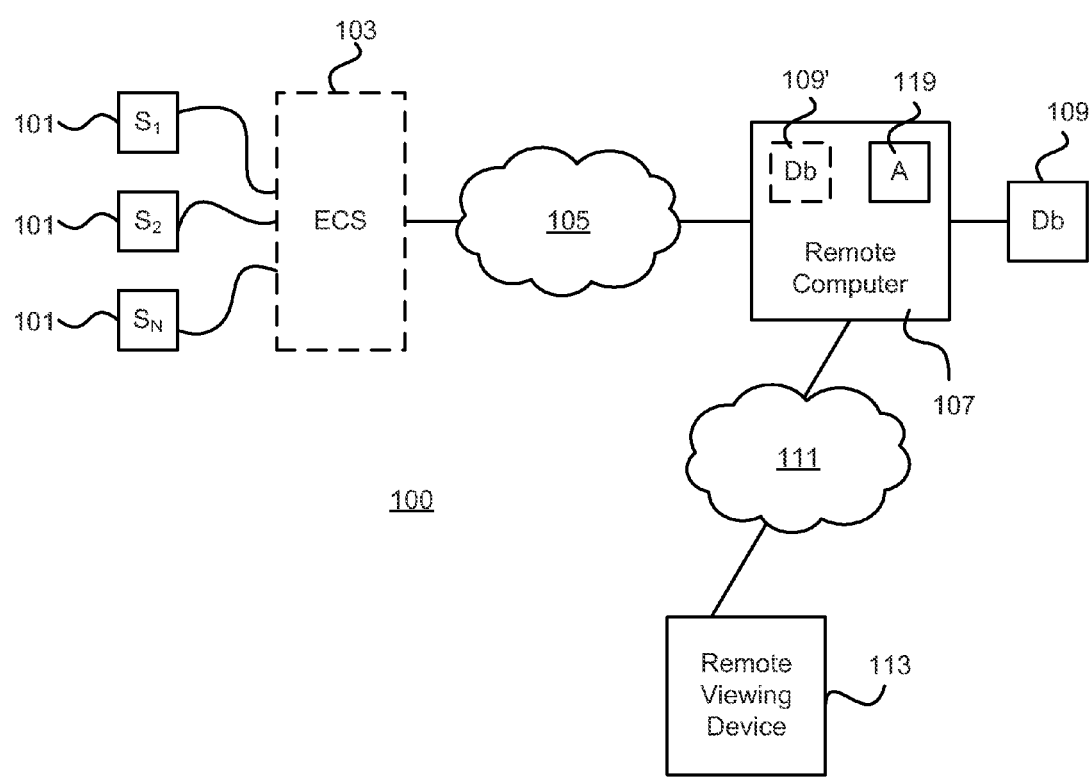
FIG. 1 is a diagram of an embodiment of the remote monitoring system of the present invention.

Where the definition of terms departs from the commonly used meaning of the term, applicant intends to utilize the definitions provided below, unless specifically indicated.

For purposes of the present invention, the term "water treatment system" refers to any system designed or used to process, treat, or generate water or a water-based product for a particular application. A "water treatment system" may be used to generate water having a predetermined, desired, or preferred set of characteristics, qualities, or properties, such as purity, etc. For example, a "water treatment system" may include a water treatment facility for generating and distributing potable drinking water for the public, a system designed to generate water for a manufacturing process, etc. In the case of a water treatment facility for generating potable drinking water, the water treatment system may further include a distribution system for distributing the potable drinking water to the public. A "water treatment system" may also be any system used to process or treat a water-based substance into a product that may be discharged into the environment, such as, for example, a central wastewater treatment plant (WWTP), etc. In the case of a WWTP, the water treatment system may further include a collection system for collecting waste water and funneling it into the central WWTP. Water treatment systems may include public or municipal systems or private systems dedicated to an industry, factory, or particular real estate development. For example, a water treatment system may include any system, plant, or facility that uses equipment based on advanced separation, filtration, dialysis, ion exchange processes, or any other basis, technology, or mechanism for processing, treating, detecting, purifying, isolating, separating, etc., water according to relevant parameters.

For purposes of the present invention, the term "water treatment core facility" refers to a central facility that processes, treats, generates, etc., water in contrast to a broader collection or distribution system, such as a central wastewater treatment plant (WWTP), for the processing or treatment of waste water, or a water treatment facility, such as a facility for the generation of potable drinking water.

For purposes of the present invention, the term "water" refers to water or any fluid that may be processed, treated, generated, produced, discharged, etc., by a water treatment system. For example, the term "water" may refer to water being treated or processed by a water treatment facility for the distribution of potable drinking water to the public, or the term "water" may refer to sewage or waste water processed or treated by a central wastewater treatment plant (WWTP). Thus, "water" may include any number of solutes, sediments, suspensions, organic matter, etc., as the case may be.

For purposes of the present invention, the term "remote monitoring system" refers to a system for remotely monitoring the operation and equipment of a non co-located water treatment system or the water quality in, toward, or from a non-collocated water treatment system using sensors to collect data that is transmitted to a remote computer for analysis, manipulation, and communication to a remote viewing device for a user.

For purposes of the present invention, the term "user" refers to a person, entity, or agency that views data, information, analysis results, or analysis reports communicated from the remote computer to the remote viewing device of the present remote monitoring system.

For purposes of the present invention, the term "sensor" refers to a device or apparatus for the detection of parameters or values relevant to water quality or the operation of a water treatment system.

For purposes of the present invention, the term "electronic control system" refers to a portion of a water treatment system that may control the operation of equipment and operation of a water treatment system. According to some embodiments, a remote computer of the present invention may access or collect data from one or more sensors via an electronic control system. An electronic control system may include an in-house Supervisory Control and Data Acquisition System (SCADA) or a Programmable Logic Controller (PLC).

For purposes of the present invention, the term "data" refers to any information, reading, measurement, etc., ultimately obtained from one or more sensors or derived from such data. The term "raw data" refers to data obtained directly from one or more sensors without manipulation. The term "historical data" refers to data obtained from one or more sensors or derived from such data at an earlier point or period in time.

For purposes of the present invention, the term "remote computer" refers to an electronic device of the present remote monitoring system that is capable of storing, processing, and/or manipulating data, raw data or historical data, such as a computer, server, etc., that is physically separated, i.e., remote, from the water treatment system monitored by such system. For example, a "remote computer" may include a web or Internet server. The "remote computer" may further include a database and/or an analyzer.

For purposes of the present invention, the term "database" refers to a device or apparatus of the present remote monitoring system used to store data, raw data, historical data, manipulated data and/or information in a logical or ordered arrangement or configuration. The database may be part of the remote computer or separate, albeit connected to or in communication with, the remote computer.

For purposes of the present invention, the term "analyzer" refers to a portion of the remote computer of the present remote monitoring system or code stored on the remote computer, such as a software program(s) or other routine(s), which may analyze, manipulate, etc., the data, raw data or historical data obtained from one or more sensors.

For purposes of the present invention, the term "local computer" refers to a computer physically located at or near a water treatment system, i.e., not remote or co-located. The local computer may assemble, collect, aggregate, manipulate, or analyze data from one or more sensors of the present remote monitoring system prior to the data being transmitted to the remote computer of the present remote monitoring system.

For purposes of the present invention, the term "remote viewing device" refers to any device or apparatus known in the art that may be used to view an output of the present remote monitoring system from the remote computer, such as, for example, personal computers or terminals, servers, etc., as well as a variety of handheld personal communications equipment, such as cell phones, pagers, PDA's, Blackberrys®, Palm® devices, I-phones, etc.

For purposes of the present invention, the term "output" refers to any product, publication, submission, uploaded content, etc., including any information, data, analysis result, analysis report, etc., that is communicated from the remote computer of the present remote monitoring system to a remote viewing device in a format suitable for display by the remote viewing device to a user.

For purposes of the present invention, the term "analysis result" refers to any information, value, relationship, product, etc., created by aggregation, calculation, algorithm, analysis, manipulation, etc., based on data obtained or collected from one or more sensors as performed by an analyzer on the remote computer of the present remote monitoring system.

For purposes of the present invention, the term "analysis report" refers to any organized presentation of data, raw data or historical data, manipulated data, information, analysis results, etc., based on data obtained or collected from one or more sensors that is generated or manipulated by an analyzer on the remote computer of the present remote monitoring system. An analysis report may be prepared for any intended recipient, such as an elected official, manager or operator of a water treatment system, customer, member of the public, etc. According to some embodiments, an "analysis report" may be a submission to a regulatory and/or law enforcement agency in any required format.

For purposes of the present invention, the term "transmission interface" refers to a portion of a water treatment system and/or remote monitoring system that is capable of transmitting data or information to a remote computer via any suitable mode of transmission.

For purposes of the present invention, the term "mode of transmission" refers to any suitable technology or device known and available in the art for transmitting data and information to a remote computer of the present remote monitoring system. The data and information may be transmitted by the mode of transmission either directly from the one or more sensors, from an electronic control system, or from a local computer connected to the electronic control system and/or one or more sensors, which may each utilize a transmission interface. Examples of modes of transmission may be achieved or carried out through any suitable medium, including, but not limited to: the Internet; TCP/IP; Ethernet; file transfer protocol (FTP); email, such as SMTP; cellular phone networks, such as CDMA and TDMA; radio signals or remote terminal units (RTU) coupled to radio frequency transmitters; satellite transmission; existing telephone or communication networks or wiring, a standard Public Switched Telephone Network (PSTN); a wireless network; a wide area network (WAN); wireless local area network (WLAN); local area network (LAN); or metropolitan area network (MAN); a cable internet connection; short message system (SMS); dial-up modem; a point to point link; global system for mobile communications (GSM, 3GSM), general packet radio services (GPRS), evolution-data optimized (EV-DO), enhanced data rates for GSM evolution (EDGE), digital enhanced cordless telecommunications (DECT), integrated digital enhanced network (iDEN), universal mobile telecommunications systems (UMTS), advanced mobile phone systems (AMPS) or any other suitable means to transmit data to a remote computer known to those skilled in the art. The exact mode of transmission may vary depending on the circumstances. According to embodiments of the present invention, the mode of transmission may transmit data or information continuously, in real time, at periodic or selected intervals, on condition, or on demand by a user.

For purposes of the present invention, the term "mode of communication" refers to any suitable technology for sending, uploading, or communicating an output, including data, information, analysis results, analysis reports, alerts, alarms, etc., from a remote computer to a remote viewing device of the present remote monitoring system. For example, according to some embodiments, a suitable technology to serve as a "mode of communication" may be the Internet or world wide web. In such a case, the output may be uploaded onto an Internet server computer, which may be the remote computer of the present remote monitoring system or the Internet server computer may be separate from the remote computer. According to other embodiments, the "mode of communication" for sending an output to, or allowing access to an output by, a remote viewing device, includes, but is not limited to: the Internet; TCP/IP; Ethernet; file transfer protocol (FTP); email, such as SMTP; cellular phone networks, such as CDMA and TDMA; radio signals or remote terminal units (RTU) coupled to radio frequency transmitters; satellite transmission; existing telephone or communication networks or wiring, a standard Public Switched Telephone Network (PSTN); a wireless network; a wide area network (WAN); wireless local area network (WLAN); local area network (LAN); or metropolitan area network (MAN); a cable internet connection; short message system (SMS); dial-up modem; a point to point link; or any other suitable means to transmit data to a remote computer known to those skilled in the art.

Description

Embodiments of the present invention provide a method and system for remotely monitoring, storing, analyzing, manipulating, uploading, reporting, etc., information and data relating to water quality and/or treatment derived from raw data obtained from a plurality of sensors of a water treatment system, which may be strategically placed to gather data or information necessary for analysis or manipulation. Such information and data may be remotely stored, manipulated, etc., on one or more remote computer(s), and/or stored on one or more database(s), which may be associated with the remote computer(s). A water treatment system according to embodiments of the present invention may include any system designed or used to generate water or a water-based product having a predetermined, desired, or preferred set of characteristics, qualities, properties, etc., for a particular application, such as, for example, a Municipal potable drinking water treatment facility, a system generating water for a manufacturing process, etc., as well as any distribution system. A water treatment system may also include any system designed or used that processes or treats a water-based substance into a product discharged into the environment, such as, for example, a central wastewater treatment plant (WWTP), etc., as well as any collection system. Water treatment systems may include a public or municipal system as well as a system dedicated to a real estate development. For example, a water treatment system may include any system, plant, or facility that uses equipment based on advanced separation, filtration, dialysis, ion exchange processes, or any other basis, technology, or mechanism for processing, treating, detecting, purifying, isolating, separating, etc., water according to relevant parameters. According to embodiments of the present invention as shown in FIG. 1, remote monitoring system 100 collects raw data from one or more sensors 101 located within a water treatment system and transmits such raw data to a remote computer(s) 107 via any known technology or mode of transmission 105. Although the embodiments shown in the figure depict data from sensors 101 being transmitted to remote computer 119 via an optional electronic control system (ECS) 103, it is to be appreciated that sensors 101 may transmit data directly to remote computer 119, which may occur in the absence of optional electronic control system (ECS) 103. According to some embodiments, remote computer 119 may be, for example, an Internet server computer. Remote computer 107 may store and manipulate raw data to produce an analysis result(s), and a database 109' may be located on remote computer 107 for storing the data. Alternatively, data may be manipulated by remote computer 107 and stored on a database 109 associated with remote computer 107. The manipulation or analysis of data may be performed by an analyzer 119, which may be a software program located on or executed by remote computer 107. According to some embodiments, one or more sensors 101 may optionally transmit raw data via an electronic control system 103, which may also control operation of the equipment of the water treatment system.

Once data is stored in either remote computer 107, database on remote computer 109', and/or database 109, remote computer 107 may then analyze or manipulate data to generate manipulated data and/or output including data and information, such as an analysis result(s) or analysis report(s), presenting or indicating the qualities, characteristics, properties, etc., of the water being treated and/or the operation of the water treatment system. The manipulation or analysis of data may be performed continuously, in real time, at periodic or selected intervals, on condition, or on demand for presentation to a user. Following analysis or manipulation by analyzer 119, the information, data, and/or analysis result(s) or report(s) may then be sent to a remote viewing device 113 using any known mode of communication 111. However, it is to be understood that according to some embodiments, raw data or direct readings may be reported directly to a user 113 without analysis or manipulation.

According to some embodiments, the information, data, and/or analysis result(s) may optionally be manipulated and displayed in an output, such as an analysis report(s), in a predetermined format, which may then be sent to a user, such as, for example, a consumer, public official, authorized personnel, or regulatory agency. Indeed, the manipulated data or analysis results may be formatted into an output or analysis report as required for submission to a regulatory agency. According to some embodiments, the analysis or manipulation of data may be presented as an output that is uploaded onto to a web server and made accessible via a web browser for presentation to, for example, a public official, consumer, or interested member of the public. Alternatively, according to some embodiments, the analysis or manipulation of data may simply send an output in the form of an alarm to alert a user of a problem or deviation.

Figure 2:
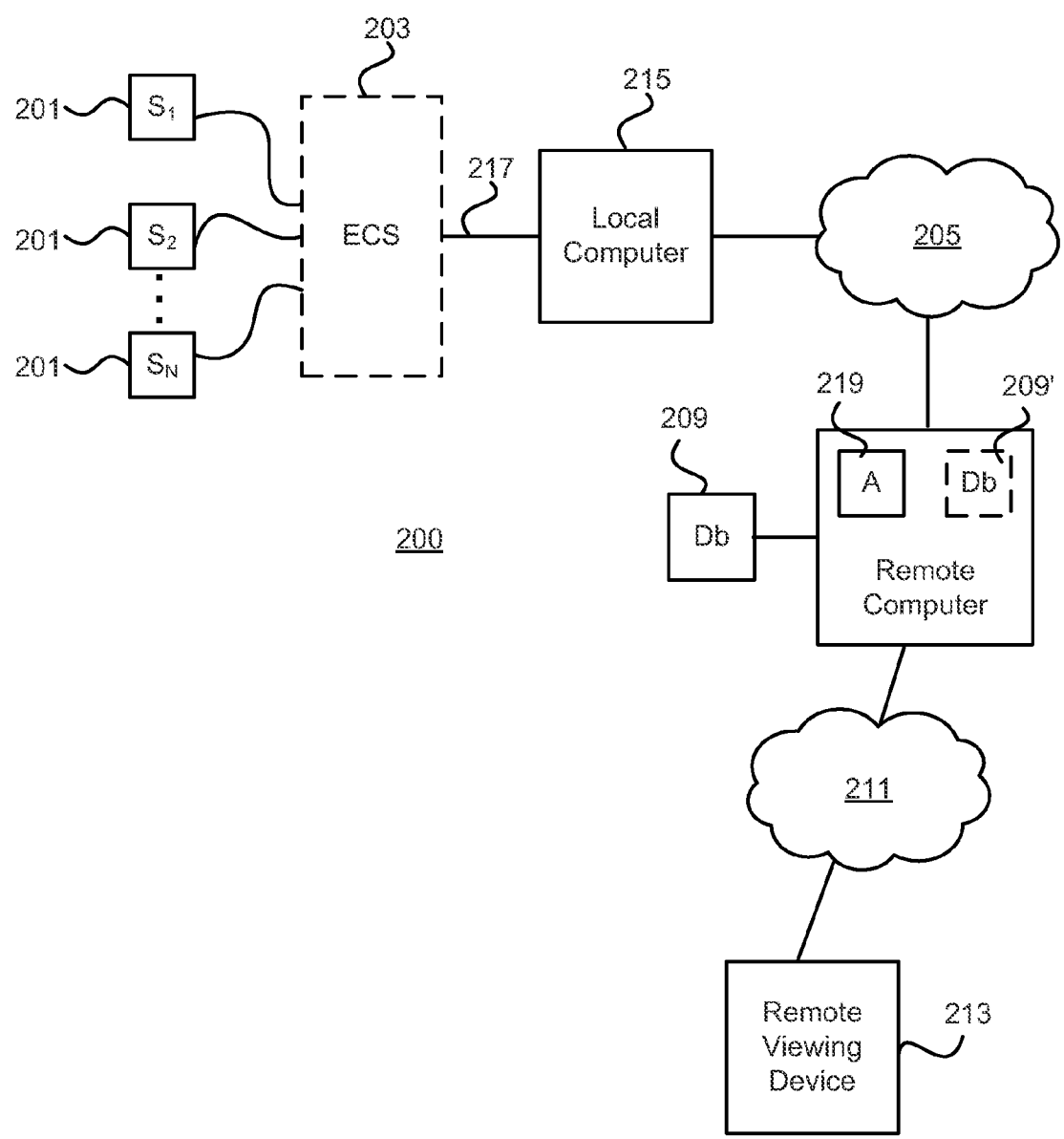
FIG. 2 is a diagram of an embodiment of the remote monitoring system of the present invention with a local computer.

According to some embodiments as shown in FIG. 2, remote monitoring system 200 of the present invention may operate similarly to remote monitoring system 100 shown in FIG. 1 but optionally include a local computer 215, which may locally store, process, and/or access raw data obtained from one or more sensors 201 of the water treatment system before being transmitted by a mode of transmission 205 to remote computer 207. Other aspects of these embodiments are similar or identical to those described above in relation to FIG. 1. Remote monitoring system 200 may optionally include an electronic control system 203 linked to sensors 201, and local computer 215 may access and capture data from one or more sensors 201 via an electronic control system 203 using a local connection 217, or directly from sensors 201 especially in the absence of an electronic control system 203. Local computer 215 may then transmit data by any suitable mode of transmission 205 to remote computer 207, and data may be stored in a database 209 associated with remote computer 207. Alternatively, a database 209' may be located on remote computer 207 for storing the data. Following analysis or manipulation by an analyzer 219, the information, data, and/or analysis result(s) or report(s) may then be sent as an output to a remote viewing device 213 for viewing by a user using any suitable mode of communication 211.

According to other embodiments of the present invention, remote computer 107,207 of remote monitoring system 100, 200 is located at a different and physically distinct location than the water treatment system, and remote computer 107, 207 of remote monitoring system 100, 200 cannot be used to remotely control or direct controls for a water treatment system, such as an electronic control system 103,203. Indeed, according to embodiments of the present invention, the only link or connection between the remote computer and the water treatment system may be the mode of transmission of the present remote monitoring system. Several benefits and advantages may be achieved by physically separating the storage, manipulation, analysis, reporting, etc., functions of the remote computer and/or database of the present invention from the site(s) or location(s) of data collection (i.e., sensors) within a water treatment system, which may further include a broader distribution or collection system.

One advantage of embodiments of the present invention, for example, is that remote storage and manipulation of water quality and treatment data may make the operation and product of a water treatment system safer and less susceptible to tampering or control by unauthorized individuals or outsiders by separating the operation and control of the water treatment system from the data analysis, manipulation, and reporting functions of the present invention. For example, this feature may be useful in detecting direct tampering, such as an act of terrorism, by an individual or outsider on a water treatment system. Since the remote monitoring of the present invention is physically separated from the operation of the water treatment system, it is unlikely that such an individual would also have access to the remote monitoring system of the present invention especially since access to the remote monitoring system may be controlled or password protected. Conversely, for example, if a hacker were to remotely access the remote monitoring system of the present invention, they would not be able to directly access and control of the operation of the water treatment system because the remote computer and database is external, physically remote, and not connected to the process facility being monitored.

Another advantage of embodiments of the present invention is that the remote monitoring system of the present invention may create a layer of redundancy that may be independent of or complementary to the direct monitoring carried out by qualified individuals at a water treatment system or facility to safeguard operation of the water treatment system. Redundancy may also be achieved by, perhaps simultaneously, reporting analyzed or manipulated data to multiple persons and/or entities in the same or different format(s). In addition, the remote monitoring system may reduce or eliminate the need for direct human involvement. By having the remote monitoring system automatically perform the calculations and manipulations on the raw data in real time without direct human involvement, there may be less human error in evaluating, analyzing, etc., water quality and the operation of the water treatment system.

Yet another advantage of embodiments of the present invention is that data and information may be combined, pooled, compiled, etc., from sensors placed at multiple location(s) or site(s) throughout a water treatment system and in the field as part of a broader distribution or collection system. According to some embodiments, sites or locations within the distribution or collection system may be considered part of the water treatment system even though the distribution or collection system may operate independently of a water treatment core facility of the water treatment system. Such sensors located at the multiple location(s) or site(s) may operate independently and have no communication between sensors other than the remote monitoring system of the present invention. By comparing data from these multiple independent sites or locations, a more advanced analysis and conclusions may be performed in view of the water treatment and distribution systems as a whole. For example, better prediction and anticipation of downstream contamination events may be made by having multiple data points obtained from sites or locations throughout a collection or distribution system associated with the water treatment system, thus allowing appropriate actions to be taken downstream to lessen or prevent the impact or damage caused by the contamination event, such as the introduction of dangerous, poisonous or unhealthful contaminants into the environment or drinking water.

For example, the water treatment core facility may be a central wastewater treatment plant (WWTP) that receives waste released from multiple sources upstream that converge into a common collection system that feeds into the central WWTP. The collection system may serve numerous waste water treatment sites or industrial waste sites that feed into be deployed at a central WWTP. According to embodiments of the present invention, multiple sensors may be placed throughout the collection system including the water treatment and industrial waste sites to monitor discharge into the common collection system. Water treatment sites may include cities, manufacturers, agricultural operations, etc., which treat waste water before it is discharged into the common collection system. For a WWTP operator, an accurate prediction of the composition of incoming waste water would be highly beneficial for the efficient operation of the WWTP facility.

According to embodiments of the present invention, the composition of influx water in a WWTP serving a geographically distributed waste water collection system may be estimated from measurements taken from sensors located upstream, such as at or near waste water treatment site(s) or industrial waste site(s) discharging into the common collection system. Since the water flow patterns, transit times, and the composition of water leaving each of the treatment or industrial sites within the waste water collection system may be known, the expected composition of influx water arriving at the WWTP can be calculated and reliably and quickly transmitted to the operators of the central WWTP. This advance notice allows the WWTP to respond to varying contaminant or pollutant introductions in a far more effective manner than at present, where the first knowledge or information may come after the contaminants have already entered or even passed through the system. For WWTP entities that operate reclamation facilities downstream of the WWTP, this advance knowledge is even more valuable as it allows the reclamation facility to modify its operations as necessary to prevent damage to the process facilities. It will be readily appreciated by WWTP operators that knowledge of the incoming waste water composition would be of great benefit in assuring the continued operation of the central facility at top efficiency.

Another advantage of embodiments of the present invention is that the cause, scope, or location of a problem or source of contamination may be better tracked and discriminated by having more independent data points of reference obtained from sensors at sites or locations throughout a water treatment system, such as sites or locations in a water treatment core facility as well as throughout a collection or distribution system, i.e., in the field. Such analysis or determinations may be aided by the existence of historical data about the operation of the water treatment system in relation to its environment which may be used for comparison. For example, a chemically or biologically active agent may be deliberately injected into the distribution system at a point downstream of a potable drinking water treatment facility. A sophisticated terrorist might first inject a chlorine scavenger, such as sodium metabisulfite, into the distribution system to eliminate the residual chlorine normally present. At some point downstream of the metabisulfite injection point, the chemical or biological agent could be injected into the water without destruction by any residual disinfectant. Without a remote monitoring system in place with sensors in the distribution system, such contamination could go undetected for quite some time, allowing a thorough infiltration of a biological or chemical agent throughout the distribution system. By contrast, the remote monitoring system could detect that the residual chlorine at the sensor had diminished to zero and sound the alarm. Especially with historical data available for comparison, the remote monitoring system would be able to reduce the incidence of false terrorist attack alarms because data obtained from sensors at the treatment facility and in the distribution system could be compared. For example, a chlorine dosing equipment failure might be determined and distinguished from a terrorist attack if a fall in chlorine concentration is observed at both the water treatment plant and at points in the distribution system.

Another advantage of embodiments of the present invention is that more sophisticated software may be used because the data is transmitted to a remote computer where more advanced computations, manipulations, analysis, etc., may be performed prior to reporting, uploading, etc., an output, such as an analysis result, analysis report, or alarm to a user. The software on the remote computer may be more sophisticated than may be achieved with the local electronic control systems used to control and operate the water treatment system, plant, or facility. This may allow for the processing power of the existing control systems to not be impaired or impacted. For example, an analysis report generated by manipulation of the data on the remote computer may include a submission to a regulatory agency to meet reporting requirements in the format required by the agency, and such reporting may be performed automatically. The remote analysis, manipulation, etc., may be performed quickly and automatically to remotely monitor operation and water conditions in real time, continuously, at selected, periodic, or regular intervals, on condition, or upon demand of a user and rapidly generate multiple types of outputs, such as alarms, analysis results, analysis reports, etc., to one or more users. For example, the software program may separately generate a detailed regulatory report for submission to a regulatory agency, send a simple alarm to authorized personnel to alert of a contamination or equipment failure, and post data and information about the water treatment system on a web page for access by a member of a public.

Yet another advantage of embodiments of the present invention is that greater flexibility and accessibility may be achieved over existing systems allowing access to the remote computer to receive data, information, reports, etc., sent by any known communication means from the remote computer. By having greater accessibility and communication of data, information, reports, etc., greater coordination may be achieved between different parts of the water treatment system and any associated collection or distribution system, which may include, for example, remote sites or locations of industrial waste discharge in the case of a WWTP.

Yet another advantage of embodiments of the present invention is that the remote monitoring system may be implemented with moderate cost since the remote monitoring system may be incorporated or interface with existing sensors or electronic control system of the water treatment system. Furthermore, the data collected from the water treatment system may be transmitted electronically to the remote computer using existing communication networks.

According to embodiments of the present invention, raw data about the operation of a water treatment system or the characteristics, conditions, qualities, properties, etc., of water processed or treated by a water treatment system may be acquired, collected, detected, measured, etc., by one or more sensors placed at one or more sites or locations within or throughout the water treatment system, which may include sites in the field, i.e., in a collection or distribution system. Sensors may be strategically placed to gather relevant data and information at appropriate sites or locations and/or provide logical functional groupings for review and analysis.

According to embodiments of the present invention, the one or more sensors may be used to obtain relevant raw data about the operation of a water treatment system and/or the quality of water being processed, treated, received, distributed, etc., that would be relevant to the analysis, manipulation, and evaluation of the data in generating an output, such as an analysis result, report, alarm, etc. For example, each of the one or more sensors may be used to measure, quantify, or detect the following characteristics, conditions, qualities, properties, etc., of water. Examples of characteristics, conditions, qualities, properties, etc., of water include, but are not limited to: water temperature, chemical composition including total organic carbon (TOC), quantity, flow rate, and types of wastes such as those commonly discharged into streams from waste water treatment or industrial sites, contaminants, conductivity, pH, pressure, turbidity, permeate flow, chlorine or fluorine concentrations, tank levels, and equipment status and operation. According to some embodiments, a regulatory report would contain information necessary to enable a regulatory agency to determine operational parameters and quality and quantity of the treated water such as water production rate (flow), treated water consumption rate (flow), treated water storage volume, reserve capacity (at current production and consumption rates), final treated water quality, reports and archive data for regulatory compliance and/or QA/QC documentation.

In the case of water districts, electronic sensors may be used to detect or measure the amount of storage, discharge pressure and flow from the systems. Other parameters may be determined by analytical tests. Many of the sensors used to continuously monitor water treatment operations are based on advanced separation processes employing selective ion membranes which concentrate the analyte for detection. For example, detection of chlorine may be mediated via an ion selective membrane which may readily and specifically pass an analyte, such as free chlorine or hypochlorous acid (HOCl), thus separating and concentrating the analyte from the bulk solution. The sensors may incorporate multiple sensors as part of a single detector unit.

The presence or absence of turbidity in the water supply may greatly affect the amount of disinfectant required to achieve inactivation of biological organisms. The suspended particles producing turbidity are usually removed in the water treatment process before disinfection agents are applied. However, turbidity breakthroughs do occur and failure to quickly raise the disinfection dose level may lead to insufficient disinfection residuals reaching the distribution system. This may present a threat to public health, particularly if the drinking water supply is contaminated either deliberately or inadvertently.

According to embodiments of the present invention, the one or more sensors may optionally be integrated or connected to an electronic control system. The electronic control system may generally be used to control the operation of a water treatment system by local operators. Examples of an electronic control system may include an in-house Supervisory Control and Data Acquisition System (SCADA) or a Progammable Logic Controller (PLC). The electronic control system may be composed of any available commercial devices for converting analog to digital, such as Analog to Digital boards, specifically designed for the purpose of converting instrument readings or data to computer readable form. Thus, the remote monitoring system of the present invention may utilize existing instrumentation and control systems as well as existing communication devices. The electronic control system may perform basic analysis of the raw data to produce an analysis parameter that may then be sent to the remote computer. According to some embodiments, the electronic control system may continuously scan the sensor data and automatically log and archive the data at specified intervals. According to some embodiments, raw data obtained from a sensor may be stamped or labeled with time and location information, such as a unique identifier(s), for aiding subsequent analysis or manipulation. Raw data obtained from a sensor may also be labeled according to the particular order in which the data is sent to a remote computer. According to some embodiments, the electronic control system may include a transmission interface which functions to transmit the data to the remote computer.

According to some embodiments, the remote monitoring system may further include a local computer at the physical location of the water treatment system. The local computer may read, query, access the data collected from the one or more sensors of the water treatment system, store in an appropriate electronic format at least transiently, and/or transmit the data to the remote computer. For example, storage of the data on the local computer may provide an on-site data backup, and the data may be added to an historical data file for use in analysis to allow a current data file to be reused for new data collection. According to some embodiments, the local computer may be connected to the electronic control system and access the data via the electronic control system. Any type of connection, electronic or otherwise, may be used, such as, for example, a serial interface board, a USB interface card, a network connection, wiring, etc. According to some embodiments, a user may use the local computer to view or display the data or results or reports generated from the data stored and/or analyzed, manipulated, etc. on a remote computer.

According to some embodiments, a local configuration file on the local computer may tell a program on the local computer which register addresses of the electronic control system to access, any scaling factor which needs to be applied, a physical description of the data being collected, etc. The data set collected may then be converted into a form for transmission, such as a comma delimited string value, and perhaps stored locally and possibly encrypted for security on a storage medium such as a hard disk.

According to embodiments of the present invention, the data and information obtained, acquired, collected, detected, measured, etc., from the one or more sensors may be transmitted to a remote computer, which may be located off-site, using any known and available mode of transmission. The data and information may be transmitted either directly from the one or more sensors, from the electronic control system, or from a local computer connected to the electronic control system and/or one or more sensors. Once transmitted and received by the remote computer, the data and information may then be remotely stored on the remote computer or a database associated with the remote computer and manipulated to generate an output, such as an analysis result, report, alarm, etc., that may be communicated to a user.

According to embodiments of the present invention, the remote monitoring system of the present invention may further comprise a database or software-implemented database associated with the remote computer for storage of data. The database may be stored on the remote computer or a separate unit, and the number of remote computer(s) and/or database(s) may be varied to suit a particular application, network traffic, or demands of a particular client. According to some embodiments, for example, the remote computer may comprise a computer, an ftp server, a database, and/or a web or internet server, which may each be located at the same or different locations and use any available and appropriate operating systems. This storage on the database may take many forms such as flat files, spreadsheets, and relational or non-relational databases. According to some embodiments, for example, the database may be a relational database, such as Microsoft SQL Server or Oracle database products.

According to embodiments of the present invention, the exact mode of transmission may vary depending on the circumstances. Any suitable technology or device known and available in the art for transmitting data to a remote or physically separated computer is contemplated for use as a mode of transmission according to embodiments of the present invention. Examples of modes of transmission may be achieved through any suitable medium. According to embodiments of the present invention, the data may be transmitted, for example, continuously, in real time, at periodic or selected intervals, on condition, or on demand by a user. The data may also be encrypted for security for additional security, and may be decoded by the remote computer and/or the database and placed in the appropriate locations.

According to some embodiments, the data may be transmitted to the remote computer directly by the sensor assemblies comprising the one or more sensors. According to these embodiments, the one or more sensors may be fitted with communications processors which enable the sensors to send data directly to the remote computer. Suitable instruments may include sensor assemblies having a transmission interface effective for real time data transmission, such as a LonWorks® network variable interface. Suitable sensors may also include, for example, the Six-CENSE® and the CT-CENSE® manufactured by Dascore, Inc., as well as the multi-sensor devices manufactured by Sensicore, Inc. In this example, sensors may transmit the data to a remote computer by any suitable mode of transmission known in the art, such as an Internet server computer, and may be connected to a remote computer through an existing telephone wiring on a dedicated network connection or cell network.

According to some embodiments, the data may be transmitted to the remote computer via an electronic control system connected or coupled to the one or more sensors using any suitable mode of transmission known in the art. For example, a section of ladder logic or function block program code may be inserted into the code base of the electronic control system which directs the electronic control system to send specified data to the remote computer and/or database. The communications protocol may be any protocol supported by the electronic control system which facilitates the transmission. For example, RSLinx®, a software program from Rockwell Software, may be operative on the remote database computer to facilitate the transmission by a PLC. Alternatively, any number of commercial communications drivers may be used such as those produced by commercial providers such as Kepware®, Wonderware®, and so on. In the case of an electronic control system typified by SCADA® or HMI® products, such as Wonderware®, RSView®, WinCC®, and other similar products, code blocks may be added to the control code to allow the operating program to collect and send data to the remote computer. Thus, in this manner the steps of collecting data locally, possibly storing it temporarily, and subsequently transmitting this data to a remote computer is incorporated into the electronic control system.

According to some embodiments, the data may be transmitted to the remote computer via a local computer connected or coupled to the one or more sensors directly or the electronic control system connected or coupled to the one or more sensors. According to these embodiments, the local computer may transmit the data acquired or collected directly or indirectly from the one or more sensors to the remote computer by any suitable mode of transmission known in the art.

According to embodiments of the present invention, after the data and information obtained from the one or more sensors is sent to the remote computer of the remote monitoring system, the remote computer may analyze or manipulate the data to generate an output, such as manipulated data, an analysis result, an analysis report, an alarm, etc. The analysis, manipulation, etc., of the data may be performed by an analyzer, such as a software program or routine, that may be housed on the remote computer and/or the remote database associated with the remote computer. Generally speaking, the analyzer may be one or more software program(s) on the remote computer. Such an analyzer may perform analysis, calculation, comparison, manipulation, etc., of the data to generate an output, such as an analysis result, an analysis report, an alarm, etc., relevant to the monitoring of a water treatment system, and the analysis, calculation, comparison, manipulation, etc., may be performed continuously, in real time, at periodic or selected intervals, on condition, or on demand. According to embodiments of the present invention, the data acquired or collected from the one or more sensors may be compared by the analyzer to expected or historical performance data or records and/or to any known values and constants, such as known or expected transit times, location-specific flow rates and patterns, and distances within different portions of a water treatment system, known physical and chemical properties and characteristics of water, contaminants, disinfectants, pollutants, etc., using any known equations, algorithms, etc., which may be used to model, predict, or compare the performance of the water treatment system or the quality of water processed or treated by the water treatment system. Data acquired or collected from the one or more sensors may be compared to each other and/or to historical data, and calculations may be performed to generate an output, such as an analysis result(s), etc. According to embodiments of the present invention, the analyzer or software may perform any calculation, computation, comparison, analysis, etc., that would be relevant, suitable, or appropriate to monitoring of the operation of a water treatment system or the processing or treatment of water in a water treatment system.

According to some embodiments, the analyzer may also interpret and consider any identifier(s) or configuration files associated with the data that may indicate or identify the origin, location, and time of the data capture from the one or more sensors. The analysis and calculation of the data may be performed by the analyzer to determine or indicate performance, evaluation, preventative maintenance, scheduling, optimization, and trouble shooting of the operation of the water treatment system or equipment, in addition to monitoring water quality. For example, the data may be compared to known or expected performance data or parameters to calculate a differential, which may be used to determine if the water treatment system is performing within a normal range or out of bounds if a predetermined differential is exceeded. Such comparisons may be based on the amount or concentration of, for example, a disinfectant, contaminant, or pollutant present at different locations in a water treatment system. If the differential is exceeded, then appropriate persons, operators, and/or agencies may be alerted. Alternatively, for example, the data may be compared to known, expected, or historical data or values to determine if the operation of the water treatment system is optimized.

According to some embodiments, the analyzer may convert the data into a consistent set of units, and thus translates all values into a common format, such as pounds per square inch (psi) for pressure, using a units conversion sub-program to allow for appropriate comparisons and calculations. Furthermore, the data may be normalized to specific configurations and conditions for a water treatment system. For example, the feed pressure may be critical in determining the future and current performance of a system in reference to its performance when new. For reverse osmosis membranes, changes in pressure are related to age, production rate, and temperature and vice versa. Thus, a change in flow rate may or may not indicate that the overall system's performance has changed when normalized and compared to its performance when new or recently cleaned. Prior to this invention, the complex mathematics for these conversions required some manual intervention on the part of the operator to compute the normalized conditions. Embodiments of the instant invention may do this automatically and report normalized data to the output.

According to some embodiments, the analyzer or software of the present remote monitoring system may be used to make any suitable statistical inferences, derivations, conclusions, or predictions from the data, especially based on a comparison to historical data or expected values. Such an analysis or manipulation of the data may provide an indicator of either normal or abnormal operation of a water treatment system or characteristics, properties, qualities, etc. of water processed or treated by a water treatment system. According to some embodiments, the analyzer may be used to predict conditions, such as the presence, quantity, or concentration of a disinfectant, contaminant, or pollutant at a downstream location at a later point in time based on data obtained from sensors at upstream locations within a water treatment system.

For example, in the context of a water treatment facility for providing potable drinking water to the public, data, disinfectant concentration and turbidity, may be analyzed from both the treatment facility and the distribution system, and historical information as well as known constants may be used to predict expected conditions at points downstream within the distribution system based on expected lag times and the effluent conditions from the treatment facility.

For example, data may be collected from the water treatment facility about relevant information, such as chemical dosing rates, filtered water turbidity, chlorine residual, etc. as well as data from sensors in the distribution system, such as chlorine residual, etc., may be used for comparison. With historical data as a reference point, one can calculate a chlorine demand from the chemical dose rates, flows, and residual using the current data. Chlorine Demand may be defined as the actual amount of chlorine which is reacting, typically calculated as free chlorine dosed less the residual. Chlorine demand may be correlated with temperature, season, and filtered water turbidity. Additionally, residual chlorine leaving the plant may be correlated with residual chlorine within the distribution system. If the actual chlorine residual measured at the distribution system point of measurement varies from the historical values expected from the chlorine residual leaving the treatment facility by more than a set percentage or number of standard deviations, then an alarm or alert may be issued by the remote monitoring system of the instant invention.

As another example in the context of a water treatment facility for providing potable drinking water to the public, data obtained from the one or more sensors may be combined with known system constants such as flow rates, residence times, and so on, to continuously generate a calculated product of disinfectant concentration times contact time C*T. This simple factor alone is quite useful in predicting the amount of biological organism deactivation.

As another example in the context of a waste water treatment plant (WWTP), an analysis or manipulation of data obtained from sensors at upstream locations in a collection system, such as sites or locations of discharge from water treatment or industrial waste water plants, to detect the amount of a contaminant, pollutant, may be used to predict the future composition and flow rate of water arriving at the central WWTP. This may be accomplished in a simple manner by using known or expected constants and information as well as historical records about transit time, flow rates and patterns, etc., from each of the relevant sites or locations upstream, such as within the collection system and at or near points of discharge Any results, conclusions, reports, etc., generated using such an analysis or manipulation may be used to alert operators of a central WWTP receiving waste water from the collection system of a potential overload so that appropriate precautions and changes in operation may be made. As will be readily appreciated by those skilled in the art of data analysis, this can provide a powerful indicator of either normal conditions expected at the WWTP or out of bounds conditions that may require immediate notification of responsible parties.

According to other embodiments, the projected or remaining life of equipment, such as a membrane, may be determined or estimated by the remote monitoring system based on operational performance data. Efficiency levels for equipment or a water treatment system as a whole may be determined by the remote monitoring system relative to a theoretical potential or efficiency, which may be based on a theoretical minimum water, power, and chemical consumption versus actual consumption calculated. In addition, financial and economic reports may also be generated based on performance and/or consumption data. Furthermore, the data may be analyzed and compared to federal and/or state regulatory requirements for water quality and environmental protections.

According to embodiments of the present invention, once the data is analyzed or manipulated into an output, such as an analysis result or analysis report, the output may be sent by any known, available, and/or suitable mode of communication to a remote viewing device for viewing by a user. According to some embodiments, the output may be sent to the remote viewing device or accessed by the remote viewing device continuously, in real time, at periodic or selected intervals, on condition, or on demand. For example, the output may be a notification, alarm, or alert, such as an Alarm Event, sent on condition of an emergency or abnormal, harmful, or dangerous quality, state, or condition relating to a water treatment system. Such an output may include a notification of failures, shutdowns, exceeding of critical parameters, equipment damage, etc. Alternatively, for example, the output may be composed as an analysis report, which may be in a format for submission to a regulatory and/or law enforcement agency. The remote monitoring system may send, present, or upload an output as a weekly, monthly, yearly, etc summary of performance, water quality, or other information that may be reviewed by management for the water treatment system or by elected officials, customers, vendors, or members of the public. Alternatively, the remote monitoring system may send, present, or upload an output continuously, on condition, or on demand of a user. When sent or presented, the output may reflect or show updated information and recently collected data.

According to some embodiments, the format and sophistication of the presentation of the output will likely depend on the intended recipient(s) or user(s). For example, an output, which may include information, data, analysis, results, reports, etc., about the operation of a water treatment system or the quality, properties, etc., of water processed or treated by the water treatment system, may be presented in a more sophisticated form when presented to internal management or operators of the water treatment system than when presented to elected officials, customers, or members of the public.

According to embodiments of the present invention, one or more output(s) may be sent, presented, or uploaded to one or more remote viewing device(s) in one or more formats having different sophistication or complexity based on their intended recipient(s) or user(s), even if such one or more output(s) relates to the same data or information. According to some embodiments, an output, such as an analysis result or analysis report from current data may be presented alongside and/or in comparison to historical records, which may be used to present scheduled and predicted maintenance reports. For example, the output may provide or present preconfigured performance information, maintenance, quality assurance, quality control, regulatory, cost reports, performance evaluation, graphing, historical trends, regulatory reports plant or facility process, operating and economic information, indications and scheduling for preventative maintenance, troubleshooting, etc. According to some embodiments, access to an output of the present remote monitoring system may depend on the security in place, such as a login and password or other identifying criteria.

According to some embodiments, the output may be used to report or present information or analysis of the operation or conditions in a waste water treatment plant (WWTP) particularly as it relates to health and safety concerns. The analysis result may take many different forms; however, the preferred form may be a prediction of the water composition and flow rate in terms of selected parameters of interest that may arrive at a WWTP as a function of time. Thus, for example, the remote computer may be operable to calculate a predicted concentration of various components at the time of their arrival at a central WWTP and compare the computed values with pre-established and/or historical parameters.

According to some embodiments, the output may be a report submitted to a regulatory agency in a required format, such as visual graphs, statistical reports, or a compliance calendar, to meet the reporting requirements of the agency, and such reporting or sending of the output may be performed automatically. Quality and safety standards for potable water are regulated by the Environmental Protection Agency (EPA) in accordance with the Public Water System Supervision program. The standards are enforced by local agencies. There are over 170,000 water districts in the United States which provide public drinking water to 90% of Americans. The EPA has primary standards designed to protect public health against substances that may be harmful to humans if consumed. EPA secondary standards ensure that aesthetic qualities of water, such as taste, odor, or clarity, are met. However, each water district remains responsible for monitoring the drinking water itself to ensure that it meets all drinking water standards. The treatment processes for the drinking water must be monitored as well. Therefore, the remote monitoring system of the present invention may be useful in not only monitoring whether these standards are met on a routine and continuous basis, but also providing automatic generation of regulatory reports as an output to an agency in the required format.

According to some embodiments, the remote monitoring system of the present invention may automatically prepare the documentation required to meet the regulatory requirements. Such documentation may be printed out and mailed or transmitted by a suitable mode of communication, such as by facsimile, ftp, or email, to the regulatory agency, thereby reducing or eliminating the opportunity for human error and/or unwanted manipulation. In order to comply with the regulatory testing calendar, water districts are generally required to report a list of analytical test results varying from hourly to yearly, depending on the source of the water supply. Monitoring schedules may differ according to the type of contaminants that may be present in a given water supply. The hourly tests may typically include chlorine and turbidity, which may be measured or collected automatically.

According to some embodiments, the output of the remote monitoring system may be a regulatory report sent to the department of Homeland Security and/or law enforcement agencies in situations appearing to suggest deliberate tampering of a water treatment system, such as by an act of terrorism. Embodiments of the present invention may be able to carry out sophisticated calculations, manipulations, analysis, etc. to detect tampering events and perhaps distinguish those events from normal malfunction or mismanagement.

According to embodiments of the present invention, the output may be in any format and may incorporate a tabular or graphical display as may be suitable to facilitate or focus the presentation of the data or analysis or manipulation of the data for a particular user(s). According to some embodiments, the output of the remote monitoring system may be a simplified presentation for a non-technical user that is untrained or lacks detailed knowledge about the operation of a water treatment system, such as a customer, elected official, or member of the public. For example, municipal water treatment plants are ultimately the responsibility of elected officials. Yet these officials rarely have the technical training or time to allow them directly access the performance parameters of the systems for which they are responsible. Embodiments of the present invention may easily be used to provide a readily understandable presentation output of the current performance of a municipal water treatment system. Such an output may be made accessible to the public, such as via the Internet by uploading onto a web page, thus allowing interested members of the public to monitor the operation of their own drinking water plants as desired. In providing a simplified presentation of the data to the non-technical user, operating parameters may be color coded and displayed graphically or in a tabular format, etc.

However, according to some embodiments, a simplified presentation of the data in an output of the remote monitoring system may be beneficial to even a trained operator or manager of a water treatment system. Accordingly, a graphical and/or color coded presentation of the data or analysis or manipulation of the data may potentially be used in any output format or report. A graphical presentation may include any suitable graphical format, such as tables, pie charts, bar graphs, etc., that may aid the presentation of the output or report. Color coding may be used, for example, to provide an indication of normal or abnormal operation, as well as warning status or alarm conditions. An output of the remote monitoring system may also show data or analysis or manipulation of the data in a geographical layout or form to help track or pinpoint the origin or cause of a problem. Historical data or expected values may also be shown with current data for comparison. When an output is provided to a trained user, such as a manager or operator of a water treatment system, the data and/or analysis may be presented as an exception report showing all instances where data triggered an alarm or were close to a trigger point.

According to embodiments where an output is sent or presented to management, the outputs or reports may be typically generated for three primary management levels: (A) Process systems operations, (B) Plant QA/QC, and (C) financial oversight. For instance, an output or report for a process system operations may contain information necessary to monitor, maintain, supervise, and trouble shoot process plant system performance. In this manner, typical information and parameters may include, if applicable, flow rates, pressures, delta pressures, permeate and/or ion exchange quality, pH, alarm conditions, tank levels, and a graphical presentation of applicable process performance parameters and trends.

A Plant QA/QC output or report, for example, may contain information necessary to enable plant managers to effectively manage downstream manufacturing or distribution processes. In addition, quality assurance personnel may be able to monitor the quality and quantity of the treated water to confirm compliance with specifications and standards. Information in this report may typically include treated water production rate (flow), treated water consumption rate (flow), treated water storage volume, reserve capacity (at current production and consumption rates), final treated water quality, reports and archive data for regulatory compliance and/or QA/QC documentation.

Financial oversight may be achieved with a plant economic output or report which may contain information needed by managers with profit and loss or budget responsibility to effectively track the cost of operation and to identify budget variances, when they occur, to permit timely corrective action. For this purpose, typical information parameters contained in a plant economic report may include calculated power consumption (expressed in kWh and actual cost in local currency) and computed on the basis of user's supply pump/motor efficiencies both as a year to date, as a percent of the prior period, and variances both actual and budget/actual versus prior period. The parameter may also include calculated chemical consumption (expressed in volume consumption and as converted to local currency) and computed based on the user's supplied chemical dose rates and integrated feed water flow rates. This may be performed as a year to date, as a percent of the prior period, or as variances both actual versus budget/actual versus prior period.

According to embodiments of the present invention, an output including data, analysis, results, analysis reports, etc., may be sent to a remote viewing device using any appropriate or suitable mode of communication known in the art. The output may be in any suitable file format, such as but not limited to: html, jpeg, gif, pdf, etc., based on the output type and/or remote viewing device. The output may be sent in a suitable and/or tailored to preselected recipients, such as authorized personnel or operators of a water treatment system, law enforcement, and/or regulatory agencies, in the event of an emergency or abnormal conditions or operation. The content of the output may be kept confidential, and access to the output including data, analysis, results, analysis reports, etc., may be controlled by use of appropriate account names, protocols and passwords. Multiple parties or persons may be notified, access, or receive outputs from the remote monitoring system, thus allowing redundancy in sending notifications, alarms, analysis results, analysis reports, etc.

According to some embodiments, the mode of communication for sending an output to, or allowing access to an output by, a remote viewing device may vary and may use any suitable technology. For example, according to some embodiments, an output including data, analysis results, analysis reports, etc., may be uploaded to an Internet or web server for access, visualization, or downloading by a remote viewing device, such as by using a web browser. According to some embodiments, the Internet or web server may be the remote computer of the remote monitoring system. By making the output available on an Internet web server, the communication or dispersion of the output, including data, analysis results, analysis reports, alerts, alarms, etc., may be greatly facilitated and may involve any interested or authorized recipients. For example, any authorized recipients may access data, analysis results, analysis reports, alerts, alarms, etc., of the output on a webpage by accessing the data, etc. asynchronously from the Internet server computer. Furthermore, the output, including data, analysis, results, analysis reports, alerts, alarms, etc., may be continuously or regularly updated and made available in near real time.

According to some embodiments, the mode of communication for sending an output to, or allowing access to an output by, a remote viewing device may include other suitable technologies, such as, for example, by facsimile, file transfer protocol (FTP), voice or text messaging, text to voice telephone messages, electronic mail, pager, human voice calling, SMS messages, instant messaging or groupware protocols, or other messaging medium which can be mediated by a computer program connected to a phone line, public switched telephone network (e.g. via telefax), the Internet, a cellular network, wireless or satellite communication, radio communication, etc. Examples of remote viewing devices that may be used with embodiments of the present invention may include, for example, personal computers, servers, etc., as well as a variety of personal communications equipment, such as cell phones, pagers, Blackberrys®, Palm® devices, etc. According to some embodiments, the remote viewing device may be the same as the remote computer of the present remote monitoring system.

According to another broad aspect of the present invention, a method is provided comprising the following steps: (a) providing a remote computer of a remote monitoring system having an analyzer; (b) transmitting data collected from one or more sensors in a water treatment system to the remote computer; and (c) generating an output based on the data, wherein the data is transmitted from the water treatment system to the remote computer using a mode of transmission, and wherein the remote computer uses the analyzer to generate the output. According to some embodiments, the analyzer may analyze or manipulate the data to generate the output.

According to some of the method embodiments, the water treatment system may comprise a water treatment core facility with the water treatment core facility being a water treatment facility for the distribution of potable drinking water to the public, and the water treatment system may further comprise a distribution system. According to some embodiments, the water treatment system may comprise a water treatment core facility with the water treatment core facility being a wastewater treatment plant (WWTP), and the water treatment system may further comprise a collection system. According to some embodiments, the analyzer may comprise a source code or a software program.

According to method embodiments of the present invention, the remote computer may be physically separated from the water treatment system at a distant location, and/or the remote computer may only be connected or linked to the water treatment system via the mode of transmission. The remote computer itself may comprise at least one of the following: a computer, an Internet or web server, a database, or an ftp server, and/or the one or more sensors may detect or measure one or more of the following: water temperature, chemical composition including total organic carbon (TOC), water quantity, flow rate, waste products, contaminants, conductivity, pH, pressure, turbidity, permeate flow, chlorine or fluorine concentrations, tank levels, or equipment status or operation.

According to method embodiments of the present invention, the mode of transmission may vary and may be via one or more of the following: the Internet, TCP/IP, Ethernet, file transfer protocol (ftp), email, such as SMTP, cellular phone network, radios or remote terminal units (RTU) coupled to radio frequency transmitters, satellite transmission, existing telephone or communication networks or wiring, a standard Public Switched Telephone Network (PSTN), a wireless network, a wide area network (WAN), wireless local area network (WLAN), local area network (LAN), or metropolitan area network (MAN), a cable internet connection, short message system (SMS), or a dial-up modem.

According to embodiments of the present invention, the data may be transmitted from the water treatment system to the remote computer continuously, in real time, at periodic or selected intervals, on condition, or on demand by a user using the mode of transmission. The data may be transmitted directly from the one or more sensors to the remote computer using a mode of transmission.

According to embodiments of the present invention, methods may further comprise the step of (d) comparing, analyzing, manipulating, etc., the data by the analyzer on the remote computer, wherein step (d) is performed prior to step (c). According to some embodiments, the analyzer may compare the data to expected and/or historical data or information, and the analyzer may compare the data continuously, in real time, at periodic or selected intervals, on condition, or on demand by a user. According to some embodiments, the step of (c) comparing the data may further comprise manipulating the data as well as any other information or data, such as historical data, expected performance, etc. to generate an output. According to some embodiments, the output may comprise one or more of the following: data, an alarm, an analysis result, and/or an analysis report.

According to method embodiments of the present invention, the water treatment system may include an electronic control system, and the electronic control system may be a Supervisory Control and Data Acquisition System (SCADA) or a Progammable Logic Controller (PLC). According to some embodiments, the data may be transmitted from the electronic control system to the remote computer using the mode of transmission. According to embodiments of the present invention, the water treatment system may include a local computer located at or near the water treatment system, and the data may be transmitted from the local computer to the remote computer using the mode of transmission. According to some embodiments, the data may be transmitted from the water treatment system by the remote computer accessing the data from the water treatment system, such as the one or more sensors, the electronic control system, and/or the local computer.

According to embodiments of the present invention, the method may further comprise the step of (e) communicating the output to a remote viewing device using a mode of communication for viewing by a user, wherein step (e) is performed after step (c). According to some embodiments, the mode of communication may be one or more of the following: Internet, facsimile, file transfer protocol (ftp), voice or text messaging, text to voice messages, electronic mail (email), pager, human voice calling, SMS messages, instant messaging or groupware protocols, public switched telephone network (e.g. via telefax), cellular network, wireless or satellite communication, or radio communication. According to some embodiments, the remote viewing device may be one or more of the following: personal computer or terminal, web or Internet server, file transfer protocol (ftp) server, cell phone, pager, or handheld device. According to some embodiments, the output may be accessed from the remote computer or database by the remote viewing device. According to some embodiments, the output may be downloaded or viewed using the remote viewing device, and/or the output is sent or uploaded to the remote viewing device continuously, in real time, at periodic or selected intervals, on condition, or on demand by a user using the mode of communication. According to embodiments of the present invention, the method may further comprise the step of (f) storing the data on a database associated with the remote computer. A user viewing the output communicated in step (e) on a remote viewing device may be any one or more of the following: regulator, law enforcement officer, elected official, manager or operator of a water treatment system, vendor customer, member of the public, etc. According to some embodiments, the output may be communicated or submitted to a regulatory and/or law enforcement agency in step (e).

Having described many embodiments of the present invention, it will be apparent that modifications, variations, alterations, and changes are possible without departing from the full scope of the invention as defined in the appended claims, and equivalents thereof. It should be appreciated that all examples in the present disclosure, while illustrating many embodiments of the invention, are provided as non-limiting examples and are, therefore, not to be taken as limiting the various aspects so illustrated.

What is claimed is:

1. An apparatus for monitoring a status and operation of a fluid treatment core facility, the apparatus comprising:
   one or more sensors positioned within the fluid treatment core facility;
   the one or more sensors being configured to gather data relating to:
      fluid conditions within the fluid treatment core facility,
      operating parameters of the fluid treatment core facility, and
      performance of a reverse osmosis membrane positioned within the fluid treatment core facility;
   the one or more sensor being further configured to transmit the gathered data;
   an analyzer configured to:
      receive the gathered data from the one or more sensors,
      evaluate the gathered data, and
      generate a report based on the evaluated data;
   a computer processing device disposed outside of the fluid treatment core facility and configured to:
      monitor the fluid treatment core facility, and
      transmit a result of the monitoring to a recipient;
   the computer processing device including a processor and a software program stored in a memory of the computer processing device, the computer processing device including a plurality of instruction interpretable by the processor such that the software program causes the computer processing device to perform the monitoring and to transmit the result of the monitoring; and
   a viewing device including a display, the viewing device positioned outside the fluid treatment core facility and configured to receive the result of the monitoring and display the result of the monitoring,
   wherein the monitoring includes:
      receiving at the analyzer the gathered data from the one or more sensors; and
      analyzing the data received from the one or more sensors using the analyzer,
   wherein the transmitting and displaying of the result of monitoring includes:
      transmitting the report generated by the analyzer to the viewing device positioned outside the fluid treatment core facility using a communication device; and
      displaying, at the display of the viewing device, the report in a color-coded format that allows the recipient to visually evaluate the status and operation of the fluid treatment core facility,
   the color coded display including a display of information indicating:
      the fluid conditions in the fluid treatment core facility, the fluid conditions including information regarding the quality of the fluid within the fluid treatment core facility,
      an alarm condition indicating potential harmful fluid conditions in the fluid treatment core facility, a condition of the reverse osmosis membrane,
a regulatory compliance requirement, and
a predicted maintenance requirement;
the predicted maintenance requirement being determined by the analyzer based on a current state of the fluid treatment core facility and a historical record of a previous state of the fluid treatment core facility,
wherein the analyzer is in communication with or is located on the computer processing device.

2. The apparatus of claim 1, wherein the computer processing device comprises at least one of the following: a computer, a cell phone, a handheld device, an Internet or web server, a database, or an ftp server.

3. The apparatus of claim 1, wherein the one or more sensors are configured to detect or measure at least one of the following: fluid temperature, chemical composition including total organic carbon (TOC), fluid quantity, flow rate, waste products, contaminants, conductivity, pH, pressure, turbidity, permeate flow, chlorine concentration, fluorine concentration, tank levels, equipment status, and equipment operation.

4. The apparatus of claim 1, wherein the analyzer comprises source code or a software program.

5. The apparatus of claim 1, wherein the analyzer is configured to generate the report based on expected data.

6. The apparatus of claim 1, wherein the analyzer is configured to manipulate the gathered data in at least one of the following ways: continuously, in real time, at periodic intervals, at selected intervals, on condition, and on demand by a user.

7. The apparatus of claim 1, wherein the report includes an alarm.

8. The apparatus of claim 1, wherein the viewing device is at least one of the following: personal computer, personal terminal, web server, Internet server, file transfer protocol (ftp) server, cell phone, pager, and handheld device.

9. The apparatus of claim 1, wherein the report is sent or uploaded to the viewing device in at least one of the following ways: continuously, in real time, at periodic intervals, at selected intervals, on condition, and on demand by a user.

10. The apparatus of claim 1, wherein the communication device is at least one of the following: Internet, facsimile, file transfer protocol (ftp), voice messaging, text messaging, text to voice messages, electronic mail, pager, human voice calling, SMS messages, instant messaging, groupware protocols, public switched telephone network, cellular network, wireless communication, satellite communication, and radio communication.

11. The apparatus of claim 1, further comprising a database for storing the data received from the one or more sensors, wherein the database is part of the computer processing device or is in communication with the computer processing device.

12. The apparatus of claim 1, wherein the report comprises an analysis result.

13. The apparatus of claim 1, wherein the report is sent or uploaded to the viewing device continuously.

14. The apparatus of claim 1, wherein the report is sent or uploaded to the viewing device in real time.

15. The apparatus of claim 1, wherein the color-coded graph includes a pie chart.

16. The apparatus of claim 1, wherein the color-coded graph includes a bar graph.

17. The apparatus of claim 1, wherein the color-coded graph includes an indication by color of normal or abnormal operations.

18. The apparatus of claim 1, wherein the display further includes displaying the evaluated data in geographical layout in order to pinpoint the origin or cause of a problem within the fluid treatment core facility.

* * * * *

UNITED STATES PATENT AND TRADEMARK OFFICE
CERTIFICATE OF CORRECTION

| | | |
|---|---|---|
| PATENT NO. | : 8,958,917 B2 | Page 1 of 1 |
| APPLICATION NO. | : 12/565091 | |
| DATED | : February 17, 2015 | |
| INVENTOR(S) | : Thomas D. Wolfe and Charles Scholpp | |

It is certified that error appears in the above-identified patent and that said Letters Patent is hereby corrected as shown below:

On the title Page:

In item (63), the Related U.S. Application Data should read as follows:

Continuation-in-part of application No. 11/331,721, filed January 13, 2006, and Continuation-in-part of application No. 12/272,018, filed on November 17, 2008, now Pat. No. 7,698,073, which is a continuation of application No. 10/392,112, filed on March 19, 2003, now Pat. No. 7,454,295, which is a continuation-in-part of application No. 10/055,225, filed on October 26, 2001, now Pat. No. 6,560,543, which is a continuation-in-part of application No. 09/213,781, filed on December 17, 1998, now Pat. No. 6,332,110.

Signed and Sealed this
Ninth Day of February, 2016

Michelle K. Lee
*Director of the United States Patent and Trademark Office*